United States Patent
Fletcher et al.

(10) Patent No.: US 9,841,110 B2
(45) Date of Patent: Dec. 12, 2017

(54) SPRUNG GATE VALVES MOVABLE BY A SOLENOID ACTUATOR

(71) Applicants: David E. Fletcher, Flint, MI (US);
Brian M. Graichen, Leonard, MI (US);
Matt Gilmer, Whitmore Lake, MI (US); James H. Miller, Ortonville, MI (US)

(72) Inventors: David E. Fletcher, Flint, MI (US);
Brian M. Graichen, Leonard, MI (US);
Matt Gilmer, Whitmore Lake, MI (US); James H. Miller, Ortonville, MI (US)

(73) Assignee: Dayco IP Holdings, LLC, Troy, MI (US)

( * ) Notice: Subject to any disclaimer, the term of this patent is extended or adjusted under 35 U.S.C. 154(b) by 219 days.

(21) Appl. No.: 14/473,151

(22) Filed: Aug. 29, 2014

(65) Prior Publication Data

US 2015/0060709 A1    Mar. 5, 2015

Related U.S. Application Data

(60) Provisional application No. 61/872,402, filed on Aug. 30, 2013.

(51) Int. Cl.
*F16K 3/16* (2006.01)
*F16K 3/18* (2006.01)
(Continued)

(52) U.S. Cl.
CPC ............... *F16K 3/16* (2013.01); *F02B 37/16* (2013.01); *F02M 35/10229* (2013.01);
(Continued)

(58) Field of Classification Search
CPC ... F16K 3/029; F16K 3/16; F16K 3/18; F16K 3/0227; F16K 3/314; F16K 31/0668;
(Continued)

(56) References Cited

U.S. PATENT DOCUMENTS 2,204,142 A    6/1940   MacClatchie
2,306,490 A    12/1942  Noble
(Continued)

FOREIGN PATENT DOCUMENTS

CA    1063454    10/1975
CN    2085459     9/1991
(Continued)

OTHER PUBLICATIONS

PCT, International Search Report and Written Opinion, International Application No. PCT/US2014/038018 (Nov. 26, 2014).
(Continued)

*Primary Examiner* — Mary McManmon
*Assistant Examiner* — Richard K Durden
(74) *Attorney, Agent, or Firm* — FisherBroyles, LLP; Susan M. Oiler

(57) ABSTRACT

A sprung gate for a valve having an endless elastic band sandwiched between first and second gate members that each define an opening therethrough in an open position portion thereof, which collectively form a passage through the sprung gate. The first gate member includes a fastener connected to a fastener receiving member of the second gate member thereby securing the first and second gate members together as a unit. This sprung gate unit is operatively connected to an actuator for linear translation within a pocket of a conduit to control fluid flow through the conduit. This assembled device may be manufactured using spin welding to sealingly mate the conduit to a housing enclosing the actuator.

15 Claims, 15 Drawing Sheets

(51) Int. Cl.
*F16K 31/06* (2006.01)
*F16K 3/314* (2006.01)
*F02M 35/10* (2006.01)
*F02B 37/16* (2006.01)
*F16K 3/02* (2006.01)

(52) U.S. Cl.
CPC ......... *F02M 35/10255* (2013.01); *F16K 3/18* (2013.01); *F16K 3/314* (2013.01); *F16K 31/0668* (2013.01); *F16K 31/0675* (2013.01); *F16K 3/0227* (2013.01); *Y02T 10/144* (2013.01); *Y10T 29/49425* (2015.01)

(58) Field of Classification Search
CPC .... F16K 31/1221; F16K 51/02; F16K 3/0668; F16K 3/1221; Y10T 137/0514; Y10T 137/6072; Y10T 137/6075; Y10T 137/6079; Y10T 137/6082
USPC ........ 251/175, 193, 195, 196, 326, 327, 329
See application file for complete search history.

(56) References Cited

U.S. PATENT DOCUMENTS

| | | |
|---|---|---|
| 2,705,610 A | 4/1955 | Hjulian |
| 2,750,962 A | 6/1956 | Kreichman et al. |
| 2,816,730 A | 12/1957 | Rabas |
| 2,913,220 A | 11/1959 | Cover |
| 2,953,346 A | 9/1960 | Liecke et al. |
| 3,069,131 A | 12/1962 | Grove |
| 3,113,757 A | 12/1963 | Nixon |
| 3,203,447 A | 8/1965 | Bremner et al. |
| 3,379,214 A | 4/1968 | Weinberg |
| 3,478,771 A | 11/1969 | Johnson |
| 3,534,307 A | 10/1970 | Spewock et al. |
| 3,635,601 A | 1/1972 | Larson et al. |
| 3,706,321 A | 12/1972 | Vicari |
| 3,768,774 A | 10/1973 | Baugh |
| 3,871,616 A | 3/1975 | Taylor |
| 4,010,928 A | 3/1977 | Smith |
| 4,013,090 A | 3/1977 | Taylor |
| 4,056,255 A | 11/1977 | Lace |
| 4,146,209 A | 3/1979 | Leva |
| 4,157,169 A * | 6/1979 | Norman ............. F16K 51/02 251/167 |
| 4,179,099 A * | 12/1979 | Pierce, Jr. ............. F16K 3/186 251/168 |
| 4,210,308 A | 7/1980 | Sims |
| 4,253,487 A * | 3/1981 | Worley ............. F16K 3/029 137/375 |
| 4,321,652 A | 3/1982 | Baker et al. |
| 4,340,336 A | 7/1982 | Clary |
| 4,341,369 A | 7/1982 | Meyer |
| 4,385,280 A | 5/1983 | Reisem |
| 4,446,887 A | 5/1984 | Redmon et al. |
| 4,535,967 A | 8/1985 | Babbitt et al. |
| 4,568,058 A | 2/1986 | Shelton |
| 4,585,207 A | 4/1986 | Shelton |
| 4,638,193 A | 1/1987 | Jones |
| 4,779,582 A | 10/1988 | Lequesne |
| 4,934,652 A | 6/1990 | Golden |
| 5,000,215 A | 3/1991 | Phillips |
| 5,059,813 A | 10/1991 | Shiroymama |
| 5,172,658 A | 12/1992 | Hampton |
| 5,195,722 A | 3/1993 | Bedner |
| 5,234,088 A | 8/1993 | Hampton |
| 5,235,941 A | 8/1993 | Hampton |
| 5,377,955 A | 1/1995 | Baker |
| 5,394,131 A | 2/1995 | Lungu |
| 5,627,504 A | 5/1997 | Kleinhappl |
| 5,685,519 A * | 11/1997 | Bircann ............. F16K 31/0655 251/129.15 |
| 5,909,525 A | 6/1999 | Miller et al. |
| 6,057,750 A | 5/2000 | Sheng |
| 6,158,718 A | 12/2000 | Lang et al. |
| 6,199,587 B1 | 3/2001 | Shlomi et al. |
| 6,337,612 B1 | 1/2002 | Kim et al. |
| 6,425,410 B1 | 7/2002 | Taylor |
| 6,442,955 B1 | 9/2002 | Oakner et al. |
| 6,563,238 B1 | 5/2003 | Lee et al. |
| 6,827,331 B1 * | 12/2004 | Roos ............. F01L 9/04 251/129.15 |
| 7,017,886 B1 | 3/2006 | Ngene-Igwe |
| 7,108,008 B2 | 9/2006 | Moreno |
| 7,126,449 B2 | 10/2006 | Nickel et al. |
| 7,523,916 B2 | 4/2009 | Fenton |
| 7,849,674 B2 | 12/2010 | Masuda et al. |
| 8,235,011 B2 | 8/2012 | Lengfeld et al. |
| 8,561,392 B2 | 10/2013 | Ogunleye et al. |
| 2002/0066877 A1 | 6/2002 | Nakagawa |
| 2006/0016477 A1 | 1/2006 | Zaparackas |
| 2006/0219302 A1 | 10/2006 | Knop |
| 2008/0099710 A1 | 5/2008 | Jennings |
| 2009/0020719 A1 | 1/2009 | Ishigaki |
| 2009/0094009 A1 | 4/2009 | Muller |
| 2011/0006240 A1 | 1/2011 | Williams et al. |
| 2011/0132311 A1 | 6/2011 | Pursifull et al. |
| 2012/0256111 A1 | 10/2012 | Hoang et al. |
| 2012/0256113 A1 | 10/2012 | Comeaux |
| 2012/0286182 A1 | 11/2012 | Hoang et al. |
| 2012/0313023 A1 | 12/2012 | Brock |
| 2013/0061949 A1 | 3/2013 | Minezawa et al. |
| 2013/0062548 A1 | 3/2013 | Yokomi |
| 2013/0340732 A1 | 12/2013 | Pursifull et al. |
| 2014/0353534 A1 | 12/2014 | Graichen et al. |
| 2015/0060709 A1 | 3/2015 | Fletcher et al. |
| 2015/0090355 A1 | 4/2015 | Fletcher et al. |
| 2015/0159677 A1 | 6/2015 | Hampton et al. |
| 2015/0354600 A1 | 12/2015 | Fletcher et al. |
| 2016/0153472 A1 | 6/2016 | Fletcher et al. |

FOREIGN PATENT DOCUMENTS

| | | | |
|---|---|---|---|
| CN | 1205065 | 1/1999 | |
| CN | 2480633 | 3/2002 | |
| CN | 2534389 | 2/2003 | |
| CN | 101036012 | 9/2007 | |
| CN | 101772624 | 7/2010 | |
| CN | 201679974 | 12/2010 | |
| CN | 101963240 | 2/2011 | |
| CN | 201866285 | 6/2011 | |
| CN | 102996837 | 3/2013 | |
| DE | 501 348 | 7/1930 | |
| DE | 2714933 | 10/1978 | |
| DE | 3209199 | 9/1983 | |
| DE | 19727602 | 10/1998 | |
| DE | 19841499 A1 * | 3/2000 | ............. H01F 7/081 |
| EP | 0577933 A1 | 1/1994 | |
| EP | 1333207 | 6/2003 | |
| GB | 1411303 | 10/1975 | |
| JP | 59-214280 | 12/1984 | |
| JP | 61-180423 | 8/1986 | |
| JP | 3665674 | 6/2005 | |
| WO | 95/29356 | 11/1995 | |
| WO | 01/14775 | 3/2001 | |
| WO | 2009/045140 | 4/2009 | |
| WO | 2012/100287 | 8/2012 | |
| WO | 2013/049643 | 4/2013 | |

OTHER PUBLICATIONS

PCT, International Search Report and Written Opinion, International Application No. PCT/US2014/053435 (Dec. 18, 2014).
PCT, International Search Report and Written Opinion, International Application No. PCT/US2014/065252 (Feb. 19, 2015).
PCT, International Search Report and Written Opinion, International Application No. US/2014/069461 (Mar. 4, 2015).
PCT, International Search Report and Written Opinion, International Application No. US/2014/069528 (Mar. 10, 2015).
PCT, International Search Report and Written Opinion, International Application No. US/2014/069796 (Mar. 12, 2015).

(56) References Cited

OTHER PUBLICATIONS

CN, Search Report; Patent Application No. 2014800021010 (Mar. 22, 2016).
CN, First Office Action; Patent Application No. 2014800021010 (Mar. 30, 2016).
CN, English Translation of First Office Action; Patent Application No. 2014800011432 (Feb. 3, 2016).
US, Non-Final Office Action, U.S. Appl. No. 14/277,815 (Jan. 15, 2016).
CN, Search Report; Patent Application No. 201480001143.2 (Jan. 22, 2016).
CN, Office Action; Patent Application No. 201480001143.2 (Feb. 3, 2016).
US, Notice of Allowance; U.S. Appl. No. 14/539,656; (Dec. 15, 2015).
CN, Office Action and Search Report with English translation; Patent Application No. 201410391935.7; (Sep. 2, 2016).
CN, Office Action and Search Report with English translation; Patent Application No. 201480002180.5; (Sep. 2, 2016).
US, Non-Final Office Action; U.S. Appl. No. 14/567,450; (May 19, 2016).
US, Non-Final Office Action; U.S. Appl. No. 14/565,814; (Jul. 21, 2016).
CN, Search Report with English translation; Patent Application No. 201480002102.5; (Jul. 26, 2016).
CN, Office Action with English translation; Patent Application No. 201480002102.5; (Aug. 3, 2016).
US, Final Office Action; U.S. Appl. No. 14/277,815; (Aug. 5, 2016).
US, Notice of Allowance; U.S. Appl. No. 14/567,450; (Oct. 11, 2016).
US, Advisory Action; U.S. Appl. No. 14/277,815; (Oct. 20, 2016).
U.S. Notice of Allowance, U.S. Appl. No. 14/277,815, 10 pages, dated Dec. 5, 2016.
EP, Search Report and Opinion, EP 14805033.9, 7 pages, dated Dec. 15, 2016.
EP, Supplementary European Search Report; Patent Application No. 14840859.4; 7 pages, dated Mar. 22, 2017.
U.S. Notice of Allowance, U.S. Appl. No. 14/565,814; 12 pages (dated Feb. 28, 2017).
U.S. Non-Final Office Action, U.S. Appl. No. 14/277,815; 16 pages (dated Mar. 23, 2017).
CN, English Translation of Second Office Action and Search Report, Chinese Patent Application No. 2014103919357; 12 pages, translation received Apr. 24, 2017.

* cited by examiner

SPRUNG GATE VALVES MOVABLE BY A SOLENOID ACTUATOR

RELATED APPLICATIONS

This application claims the benefit of U.S. Provisional Application No. 61/872,402 filed Aug. 30, 2013, the entirety of which is incorporated herein by reference.

TECHNICAL FIELD

This application relates to sprung gate valves and, more particularly, to a solenoid-powered sprung gate valve adapted to selectively control the flow of air or other fluids with reduced solenoid operating force, thereby enabling the solenoid actuator to be smaller than previously envisioned.

BACKGROUND

In automotive engines, vacuum developed within the intake manifold or produced by a vacuum generator (e.g., a vacuum pump or aspirator) is routinely used to power pneumatic accessories such as power brake boosters. On/off operation of the generator and/or accessory is frequently controlled by a gate valve in which a rigid gate is deployed across a conduit to stop the flow of a fluid (in this exemplary application, air) through the valve. Within automated or "commanded" valves, the gate is typically actuated by a solenoid and opened or closed in response to an electrical current applied to the solenoid coil. These solenoid-powered gate valves also tend to include a coil spring, diaphragm, or other biasing element which biases the gate towards an unpowered, 'normally open' or 'normally closed' position. Since the biasing force must overcome frictional forces resisting movement of the gate in order to return it to its normal position, and since the solenoid mechanism must overcome both these same frictional forces and any biasing force in order to move the gate to an actively-powered position, frictional forces tend to dictate much of the required solenoid operating force, i.e., the more friction, a larger/more powerful solenoid is required.

A good seal typically requires some degree of interference between the gate and the walls of the conduit. Thus, increasing the design's interference to obtain a reliable, high quality seal (especially when accounting for component variation within reasonable tolerances) tends to increase both the frictional forces resisting movement of the gate and the required solenoid operating force. However, if seal reliability and quality could be maintained with lower frictional resistance, reductions in solenoid operating force would beneficially allow for a reduction in the size, weight, and heat-dissipation requirement of the solenoid mechanism, and thus for a reduction in the size, weight, and power demand of the gate valve as a whole.

SUMMARY

Disclosed herein is a solenoid-powered gate valve that provides reliable, high quality seal with a reduced operating force requirement. The valve includes a solenoid coil and armature connected to a valve mechanism, with the valve mechanism including a conduit having a connection opening, an oppositely-disposed pocket, and a sprung gate assembly linearly movable within the pocket and through a connection opening, if needed for length of travel. The sprung gate assembly includes a first gate member, a second gate member opposing the first gate member, and an endless elastic band retained between the first and second gate members, with the first and second gate members being mechanically coupled to the armature for reciprocating linear movement. In one embodiment, this mechanical coupling includes a connecting member protruding from a trailing end of both the first gate member and the second gate member, which collectively define a multi-part socket that allows the sprung gate to rotate 360 degrees or more about its central longitudinal axis relative to the armature. The multi-part socket includes a generally annular opening most distal the trailing end and a larger chamber more proximate the trailing end relative to the generally annular opening.

In one embodiment, the first and second gate members are mechanically fastened to one another for ease of assembly, in particular insertion into a pocket in the conduit. The mechanical fastening is achieved by a fastener of the first gate member being received by a fastener receiving member of the second gate member thereby securing the first and second gate members together. The fastener may be a latch and the fastener receiving member may be a detent.

In one embodiment, the first endless elastic band is generally figure 8-shaped seated within a track in each of the first and second gate members. In another embodiment, the endless elastic band is a bellowed elastic band, which may be oriented transverse to the direction of flow therethrough.

In one embodiment, the first gate member defines a second opening therethrough in a closed position portion thereof, and the second gate member, in a closed position portion thereof, includes a plug projecting from its inner surface toward the second opening in the first gate member.

In another aspect, a valve device is disclosed which includes the sprung gate and an actuator. The actuator may be a solenoid actuator.

In another aspect, a method for assembly of the valve device is disclosed. This assembled device may be manufactured using spin welding to sealingly mate the conduit to a housing enclosing the actuator. The method includes providing an actuator enclosed within a housing with a stem protruding from the housing, an unassembled sprung gate, and a conduit. The housing includes a flange and the conduit includes a mating flange. The method includes fastening the first gate member and the second gate member to one another with an endless elastic band sandwiched therebetween and with the connecting member of each gate member of the sprung gate disposed about the stem to define an assembled sprung gate. Then, the assembled sprung gate is mated with the pocket of the conduit until the flange of the housing is seated against the mating flange of the conduit, or vice versa. The method then includes spin welding the flange of the housing and the mating flange of the conduit.

The endless elastic band permits the sprung gate assembly to produce an interference fit within the pocket without the large frictional forces that would be generated by compressing an integral gate constructed from a single, more rigid material, and reduces the need for narrow component tolerances. The slidable mechanical coupling permits the sprung gate assembly to be linearly moved between the connection opening and the pocket by a solenoid mechanism and mechanical coupling which is not precisely aligned with the gate assembly, further reducing potential frictional resistance to movement of the gate assembly.

DETAILED DESCRIPTION

Figure 1:
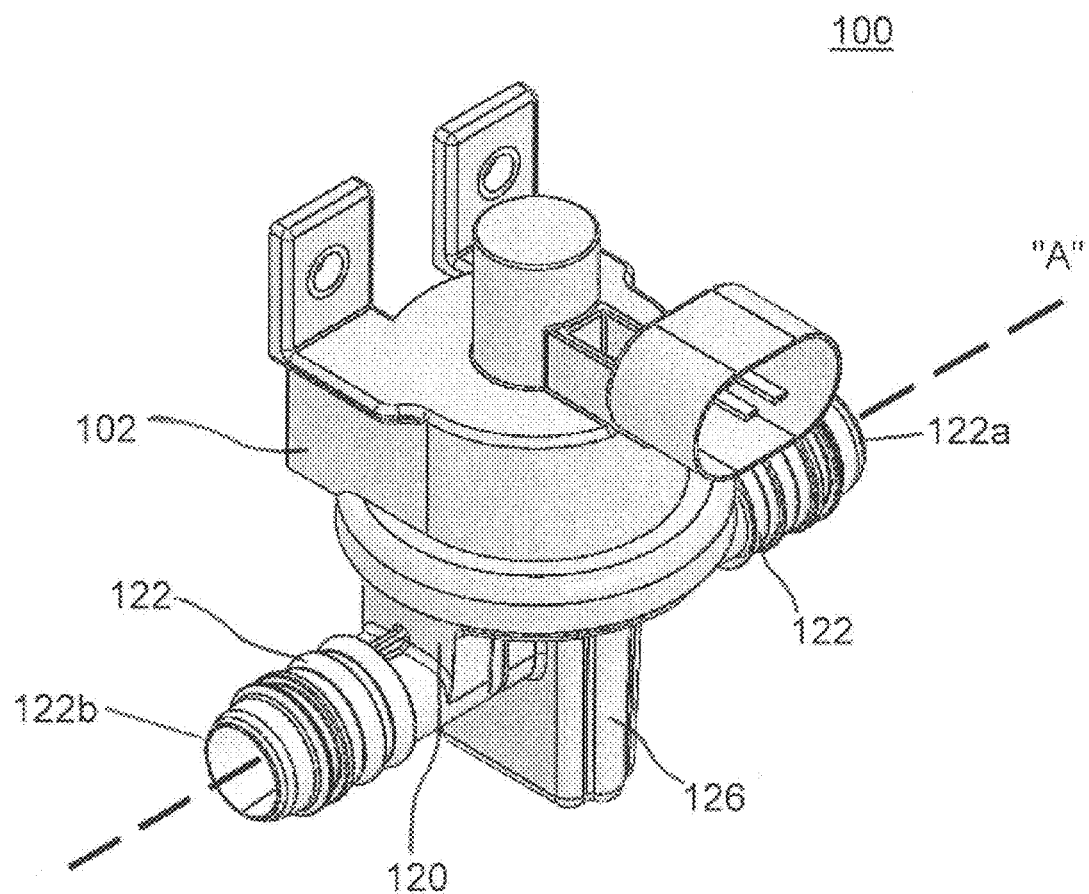
FIG. 1 is a perspective view of a valve including an actuator housing and valve mechanism.

The following detailed description will illustrate the general principles of the invention, examples of which are additionally illustrated in the accompanying drawings. In the drawings, like reference numbers indicate identical or functionally similar elements.

As used herein "fluid" means any liquid, suspension, colloid, gas, plasma, or combinations thereof.

Figure 2:
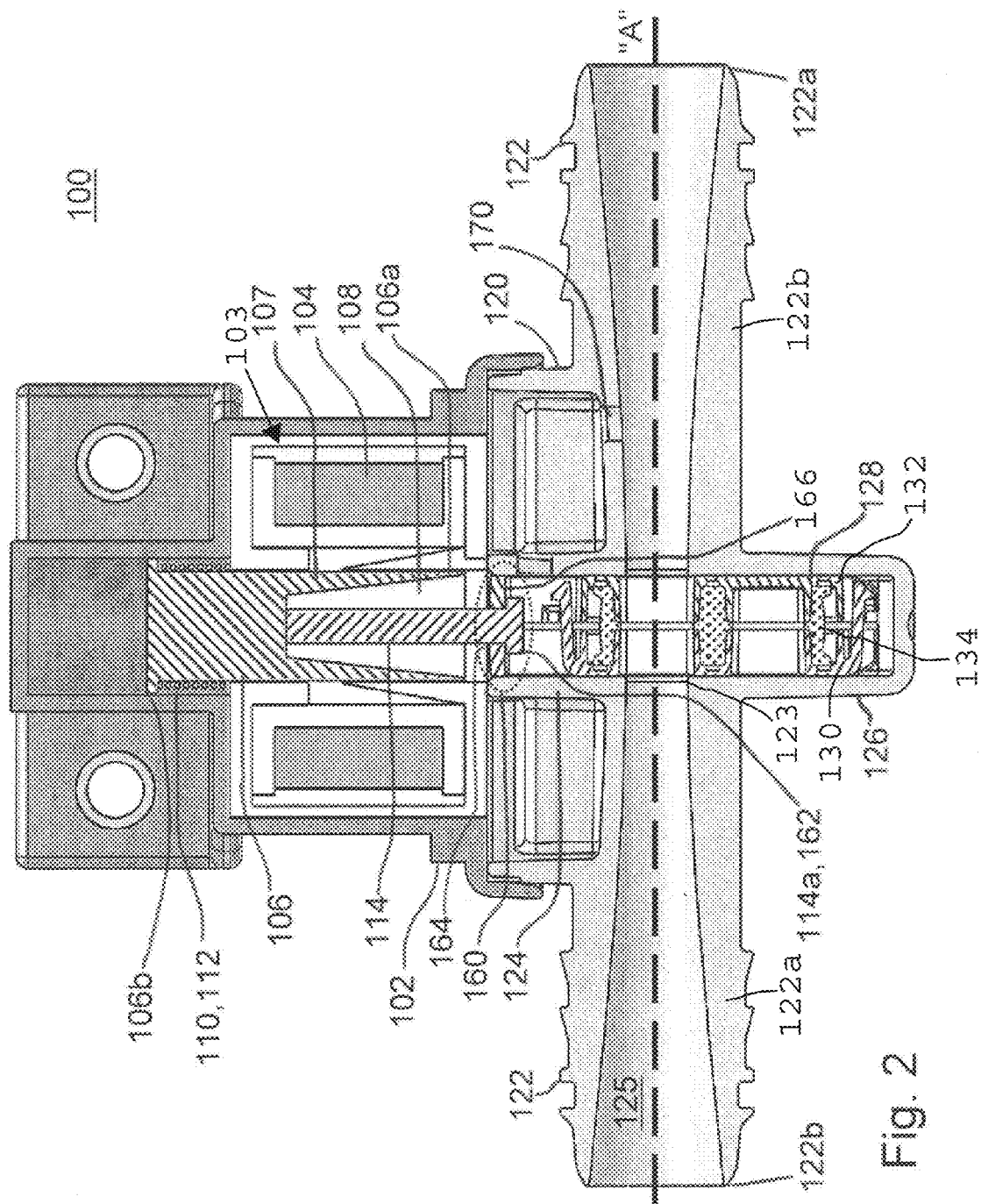
FIG. 2 is a cross-sectional view of the valve of FIG. 1 taken along the longitudinal axis and flow direction of the conduit of the valve mechanism, with a gate in an actively-powered, open position.
Figure 3:
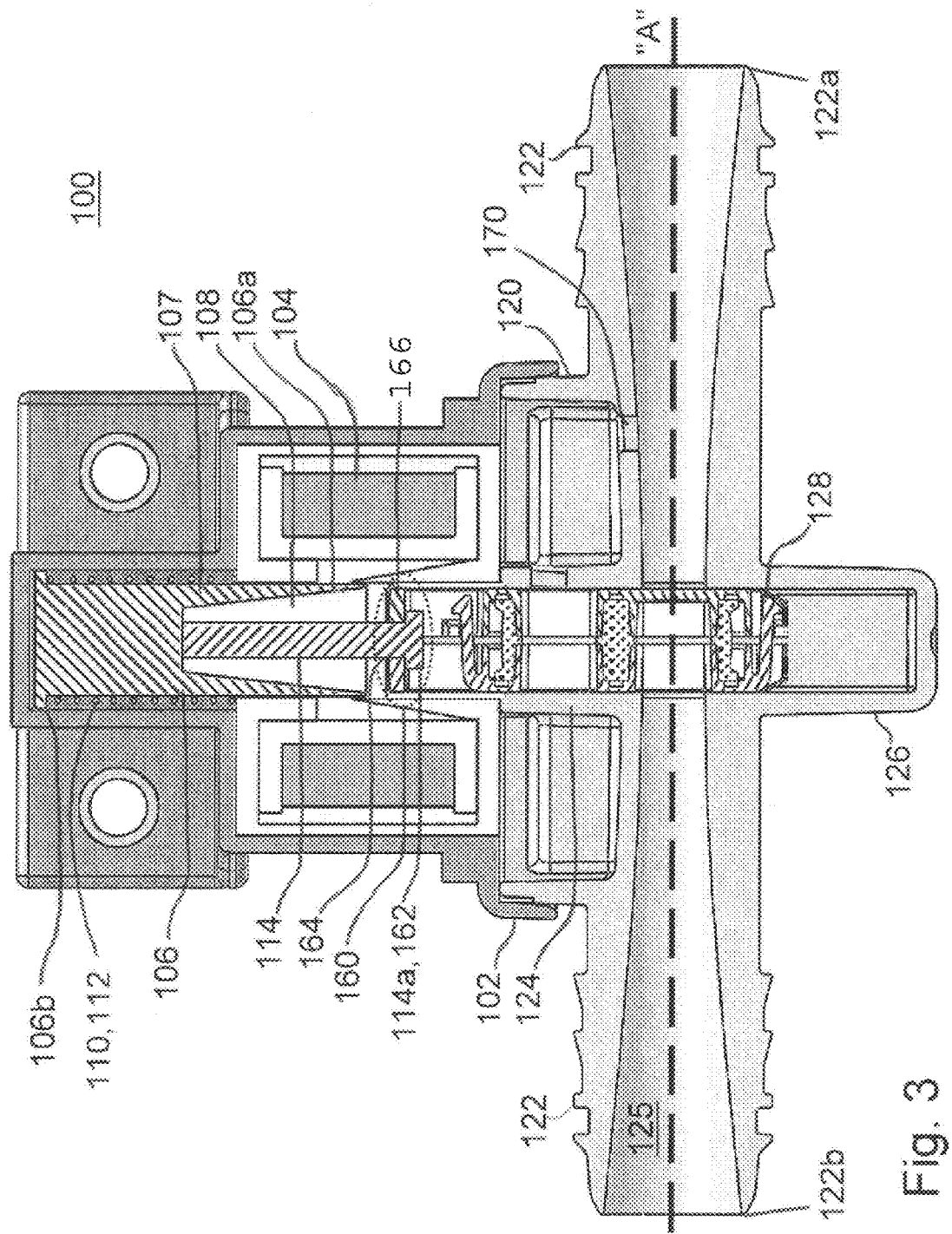
FIG. 3 is a cross-sectional view of the valve of FIGS. 1 and 2, taken along the longitudinal axis of the conduit of the valve mechanism, with the valve in an unpowered, closed position.
Figure 22:
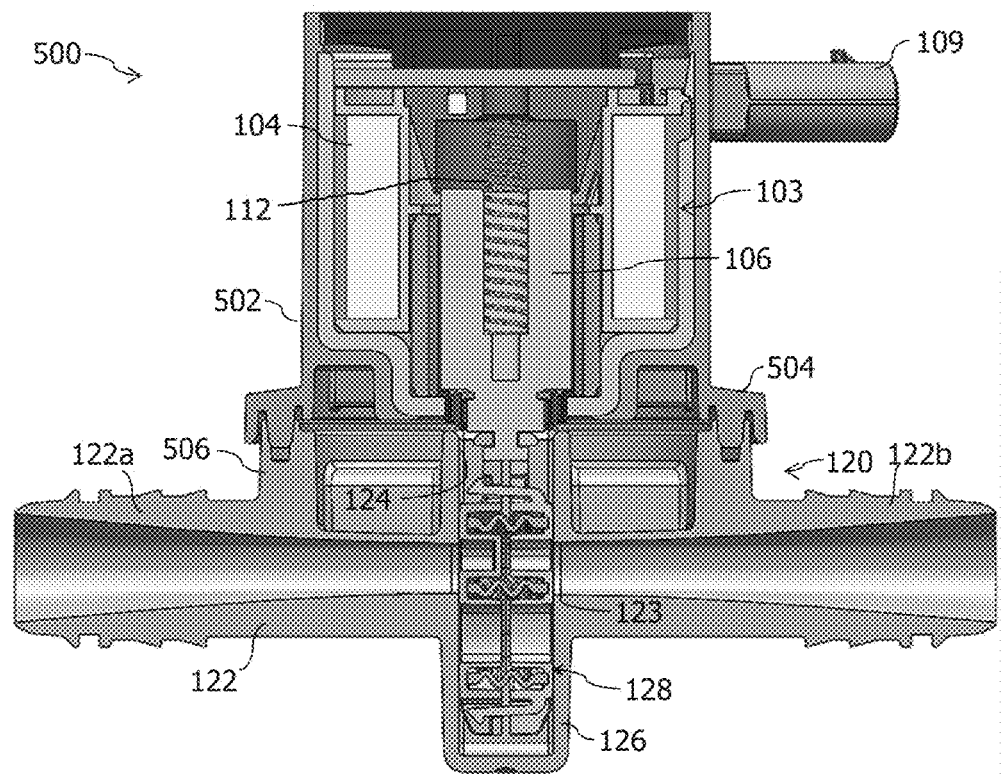
FIG. 22 is a cross-sectional view of an embodiment of a gate valve taken along the longitudinal axis of the conduit with a gate in a closed position.

FIGS. 1-3 illustrate one embodiment of a gate valve 100 adapted to selectively control the flow of a fluid, for example, air flowing from an intake to a brake vacuum boost system. The gate valve 100 may have a housing 102 containing an actuator 103 having a solenoid coil 104 and an armature 106 connectable to a valve mechanism 120. The armature 106 includes an insertion end 106a received within the solenoid coil 104 and an adjoining body portion 107 that is more fully received within the solenoid coil upon the application of an electrical current to the coil. In one construction, the insertion end 106a and body portion 107 may be cylinders manufactured from a magnetic or paramagnetic material, for example an iron-containing alloy or a ferrite-containing composite material. In another construction, the insertion end 106a and body portion 107 may be cylinders having an internal recess 108 tapering from the insertion end 106a in the direction of the body portion 107 in order to provide for a gradual increase in pull-in force. The taper may be configured so that the pull-in force is greater than an oppositely-directed biasing force produced by a biasing element 110. As shown in FIG. 2, the biasing element 110 may be a coil spring 112 surrounding the body portion 107 of the armature 106 and abutting both the solenoid coil 104 and a non-insertion end 106b, but it will be appreciated that the biasing element could be a diaphragm or flat spring abutting or coupled to the non-insertion end, a leaf spring abutting or coupled to the non-insertion end, etc. As illustrated in FIG. 22, another embodiment of a gate valve is shown that includes the biasing element 110 received in a bore 111 within the body portion 107 of the armature 106. Those of skill in the art will also appreciate that the solenoid may instead be a bistable solenoid including other biasing elements.

The valve mechanism 120 includes a conduit 122 defining a connection opening 124 facing the armature 106 and opening into a pocket 126 for receiving a sprung gate assembly 128, and the sprung gate assembly 128 linearly movable within the pocket 126 and within the connection opening 124. As seen in FIG. 2, the pocket 126 separates the conduit 122 into a first section 122a and a second section 122b and the ends of conduit adjacent to the pocket 126 define valve opening 123. The conduit 122 may be a tube that continuously, gradually tapers or narrows along a longitudinal axis "A" from both ends toward the valve opening 123, thereby having its smallest inner diameter at the valve opening 123. This hour glass-shaped cross-section 125 of the conduit path reduces the frictional forces acting on the surfaces of the sprung gate assembly 128 during its linear movement to or from an open or a closed position. This gradual narrowing of the conduit 122 also minimizes the pressure drop across the valve. In the illustrated constructions the cross-section perpendicular to the longitudinal axis "A" is circular, but in variations the cross-section 127 may be elliptical (with uniform or tapering transverse and conjugate diameters), polygonal (with uniform or tapering characteristic widths), etc.

Figure 4:
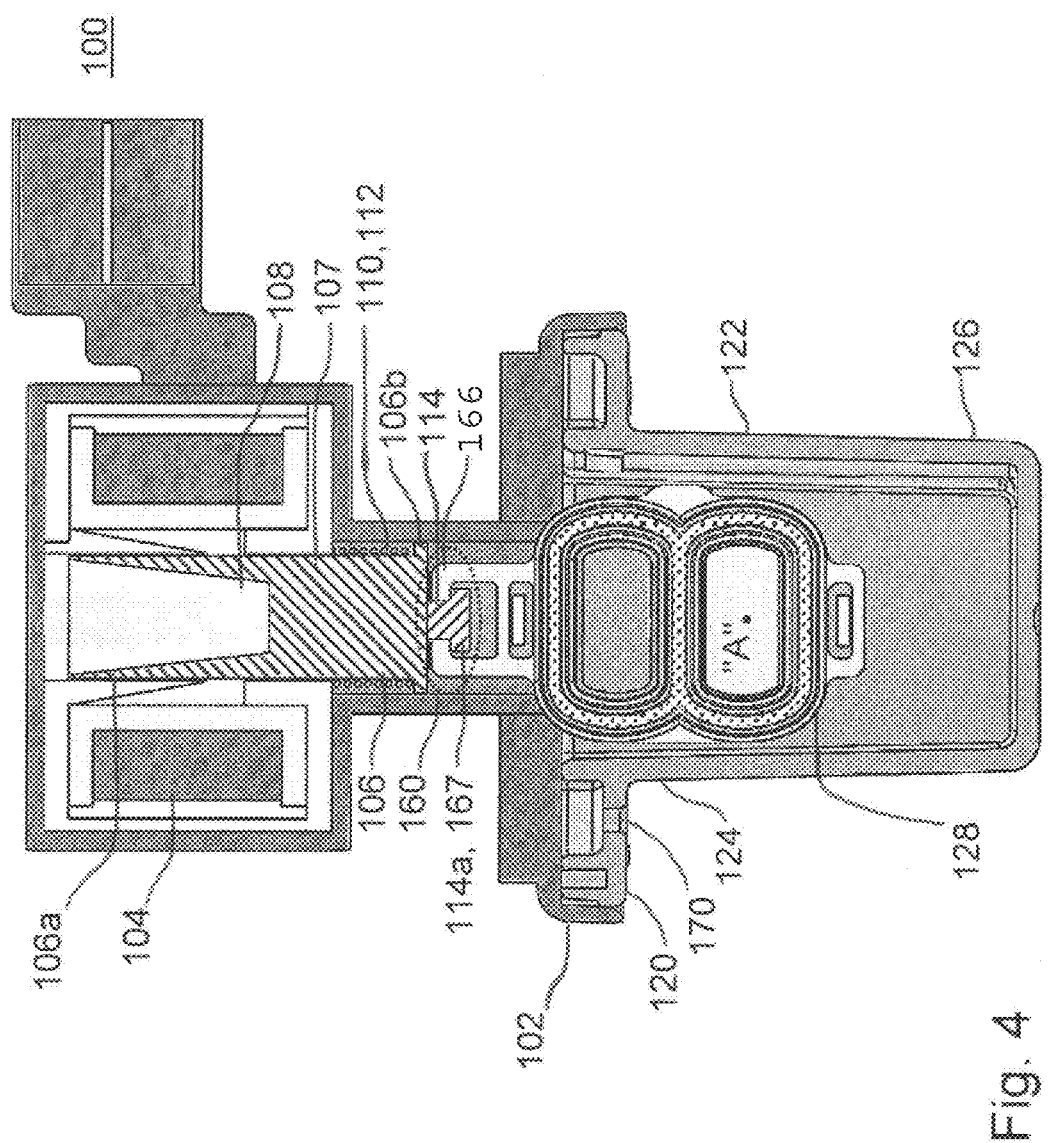
FIG. 4 is a cross-sectional view of a similar embodiment of a valve, taken along a plane perpendicular to the longitudinal axis and flow direction of the conduit of the valve mechanism, with a gate in an actively-powered, closed position.
Figure 5:
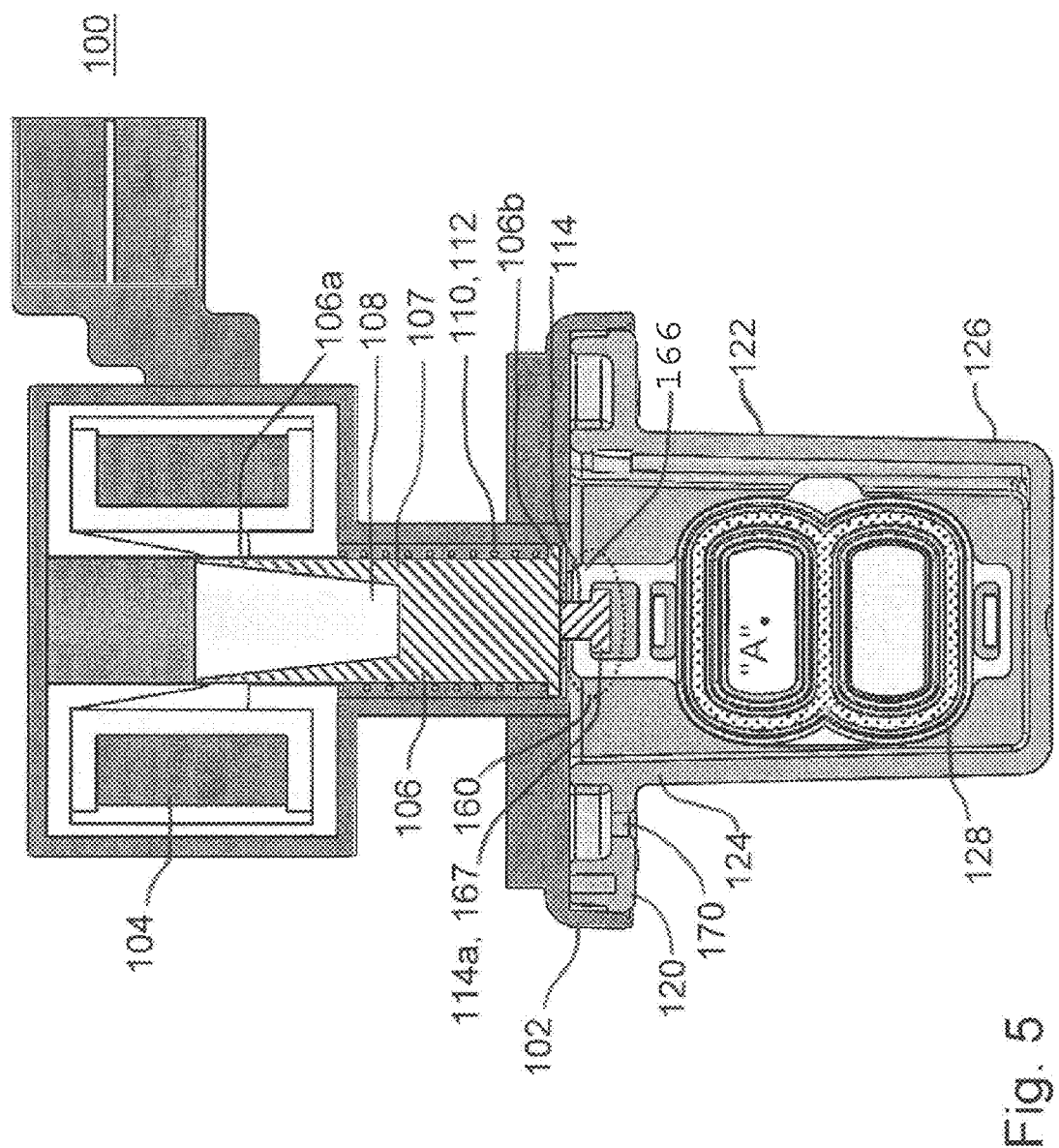
FIG. 5 is a cross-sectional view of the valve of FIG. 4, taken along a plane perpendicular to the longitudinal axis of the conduit of the valve mechanism, with the gate in an unpowered, open position.

In the embodiment of FIGS. 1-3, the sprung gate assembly 128 is mechanically coupled to the armature 106 by a stem 114 projecting from within the internal recess 108. In the embodiment of FIG. 22, the stem 114 projects from the inserted end 106a of the armature 106. In another embodiment, the stem 114 may project from the non-inserted end of the armature 106, depending whether the solenoid coil 104 and armature 106 are configured to pull the stem toward or away from the valve mechanism 120 and the connection opening 124. As shown in the embodiment of FIGS. 4-5, the relative arrangement of the solenoid coil 104, armature 106, biasing element 110, and stem 114 may be altered to change the gate valve 100 from a normally closed valve to a normally open valve or vice versa (depending upon the detailed construction of the sprung gate assembly 128, as discussed further below). In some constructions the stem 114 may be an integral projection from the armature 106, but in other constructions the stem may be an affixed projection manufactured from another, preferably non-magnetic, material.

A proximal end 114a of the stem 114 may be affixed to the sprung gate assembly 128, but the mechanical coupling preferably allows the sprung gate assembly 128 to move slideably in at least a direction parallel to the longitudinal axis of the conduit, especially in response to a bias force applied by an endless elastic band 134 positioned between the members 130, 132 of the sprung gate assembly 128. In some constructions, the mechanical coupling includes a rail system 160 that permits sliding movement of the members 130, 132 of the sprung gate assembly 128 relative to the stem 114 in a direction parallel to the longitudinal axis A. This slidable mechanical coupling allows the actuator 103 to linearly move the sprung gate assembly 128 within the pocket 126, without pulling the gate assembly towards either end of the conduit 122. Less than perfect alignment of the solenoid coil 104, armature 106, and/or stem 114 with the valve mechanism 120 would otherwise seek to cant the sprung gate assembly 128 from its path and thus tend to increase the frictional forces between the gate assembly and the walls of the conduit 122.

In the embodiments shown in FIGS. 2-3, 7-9, and 10-11, the rail system 160 may include a guide rail 162 positioned near the proximal end 114a of the stem 114, with raceway grooves 164 disposed on opposing sides thereof. The sprung gate assembly 128 correspondingly includes a slider 166 configured to wrap around the guide rail 162 and project within the raceway grooves 164. In a variant construction the rail system 160 may be reversed, with a slider 166 positioned near the proximal end 114a of the stem 114 and the members 130, 132 of the sprung gate assembly 128 each include a guide rail 162 and racetrack groove 164.

Figure 20:
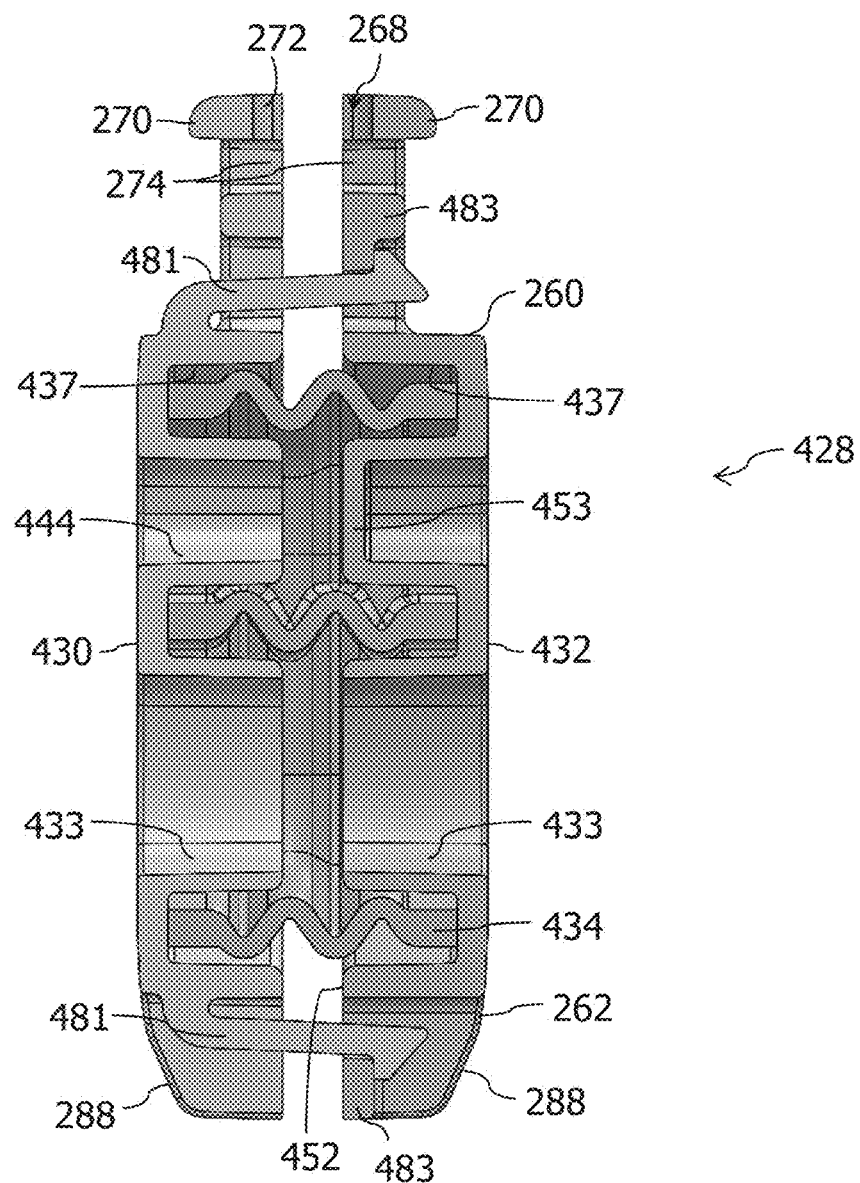
FIG. 20 is a side cross-section, assembled view of an embodiment of a sprung gate assembly.
Figure 21:
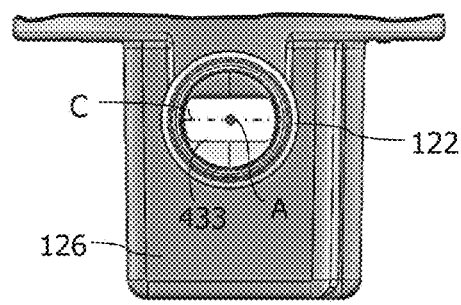
FIG. 21 is an end view looking into the motive end of the conduit with a sprung gate in an open position.

In the embodiment shown in FIGS. 4-5, the proximal end 114a of the stem 114 may include an enlarged, plate-like head 167. As better shown in FIGS. 12-14, the members 230', 232' of the sprung gate assembly 128 may collectively define a multi-part socket 268 which snaps around the head 167 to permit sliding movement in multiple directions perpendicular to the path of linear movement of the sprung gate assembly. Similarly, the gate members 430, 432 of FIG. 20 also collectively define a multi-part socket 468. As shown in FIGS. 20 and 21, the plate like head 167 may be an annular flange at the proximal end 114a of the stem 114, and as such, the spring gate assembly 128, in particular the sprung gate 228" of FIGS. 12-14 or the sprung gate 428 of FIG. 20, are free to rotate 360 degrees or more relative to the stem 114 during assembly.

Referring to FIGS. 2 and 3, the valve mechanism 120 may include a vent port 170 fluidly communicating with the connection opening 124 and, as further described below, the sprung gate assembly 128 and pocket 126, to vent fluids which leak past the sprung gate assembly and into the pocket. In highly dynamic flow environments, for example, an automotive engine in which turbocharging is used to boost air pressure within an intake manifold, differential pressures across the gate valve 100 may vary widely and even transiently reverse. High pressure air leaking into the pocket 126 may pressurize the pocket and alter the balance of solenoid operating force, biasing force, and expected frictional forces within the gate valve 100. A large differential in the pressurization of the solenoid mechanism and the pocket 126 may prevent the spring gate mechanism from linearly moving completely within the pocket, causing the valve to operate in a partially-open-and-closed state. Vent port 170 may open to the interior of the conduit 122 in order to allow fluid to flow from the pocket 126 to an inlet end of the conduit 122a (as shown in FIGS. 2-3) if the fluid is to be contained within the system, or may open to the exterior of the valve mechanism 120 (as shown in FIGS. 4-5) if the fluid may be released to the environment.

Figure 6:
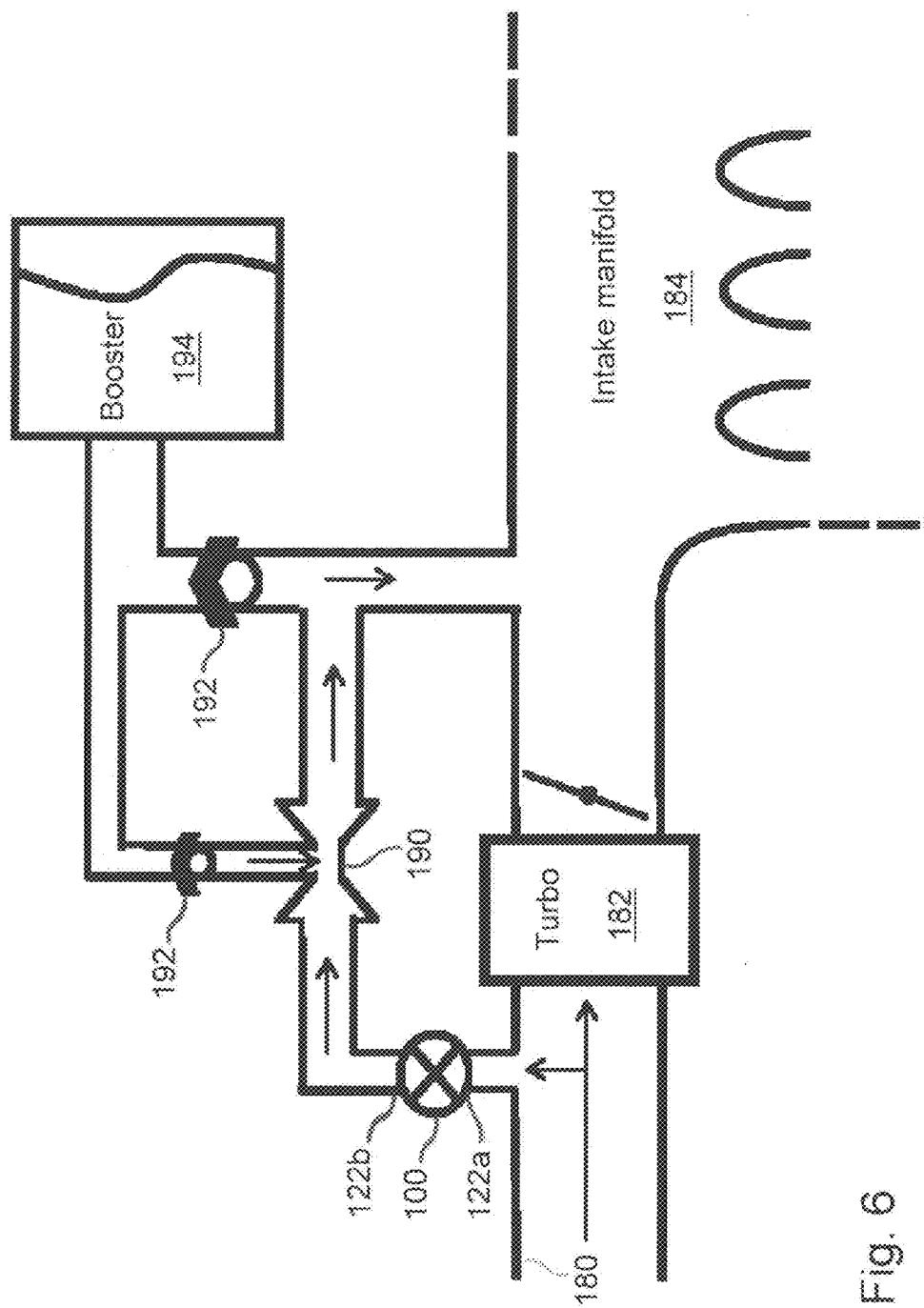
FIG. 6 is a schematic view of a non-specific embodiment in relation to an aspirator-based vacuum generator and power brake booster assembly.

Referring now to FIG. 6, the gate valve 100 may be used to control the flow of air through a vacuum boost power brake system. The conduit 122 may be connected to an air intake 180 at an inlet end 122a and to a vacuum generator, in the illustrated example an aspirator 190, at an outlet end 122b. In an exemplary turbocharged engine configuration, a turbocharger and air intercooler 182 may pressurize the air being supplied to an intake manifold 184, causing the pressure within the intake manifold to exceed the air pressure at the inlet end 122a, and potentially causing a transient reverse flow through the aspirator 190. Check valves 192 prevent the power brake booster 194 from losing its vacuum charge, however reverse flow through the aspirator 190 can cause the fluid pressure at the outlet end 122b to exceed that at the inlet end 122a. This reversed pressure differential may be even greater than the ordinary pressure differential across the gate valve 100, since turbochargers customarily provide boost pressures of about 1 atmosphere (relative) and at such high boost pressures pressure at the inlet end 122a is likely to be substantially less than 1 atmosphere (absolute). Consequently, different embodiments of a sprung gate assembly 128, further described below, may be better suited for some applications. In addition, those of skill will appreciate that the gate valve 100 may be used in other applications, including non-automotive applications, and with fluids other than air.

Figure 7:
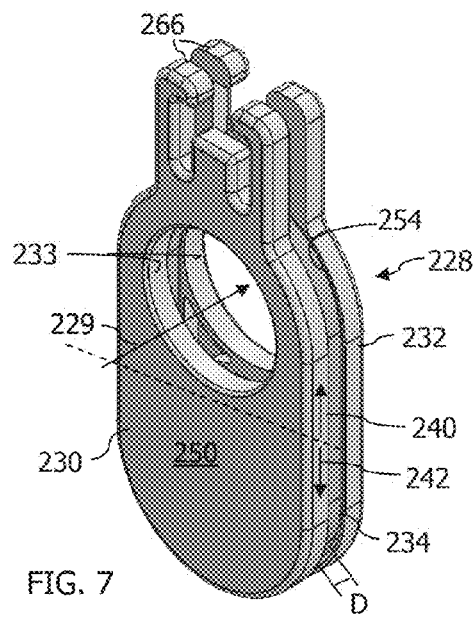
FIGS. 7-9 are a side perspective view, a bottom view, and a side perspective exploded view, respectively, of one embodiment of a sprung gate assembly.
Figure 8:
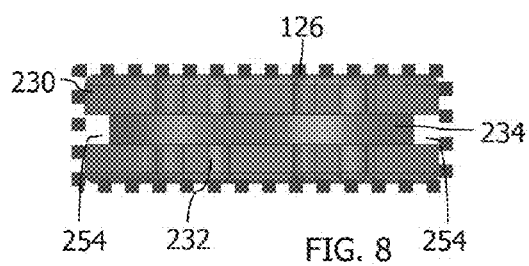
Figure 9:
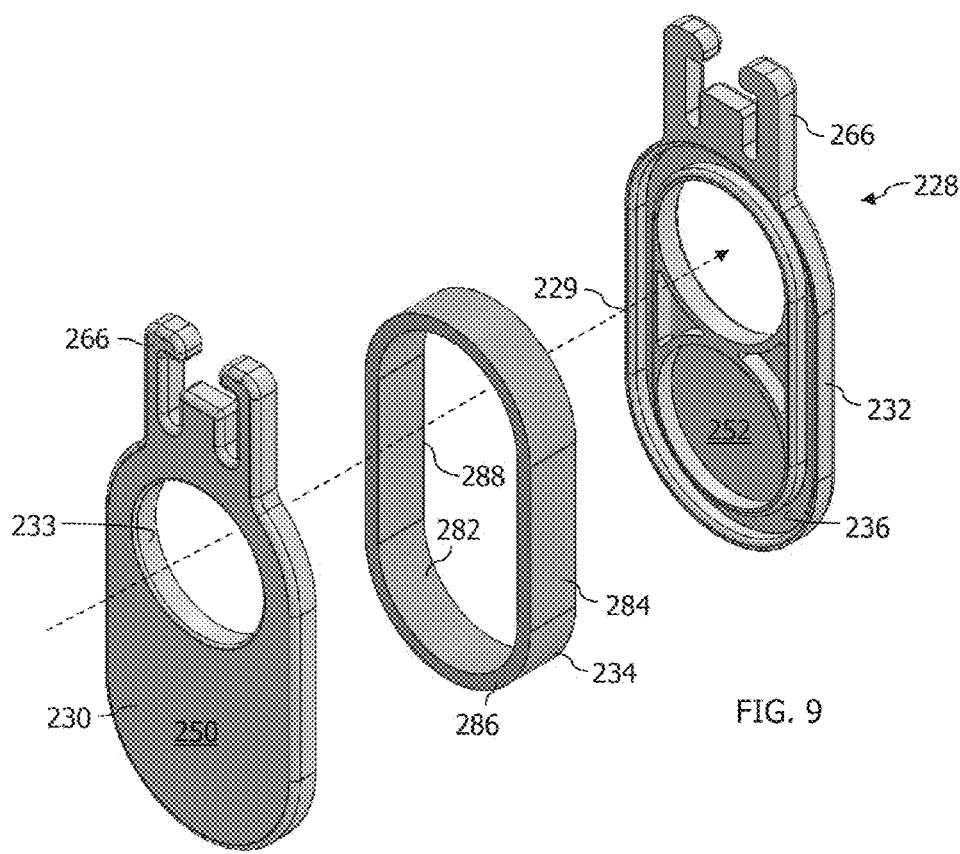

Referring to FIGS. 7-9, a first embodiment of a sprung gate assembly, generally designated as reference number 228, is illustrated. The sprung gate assembly 228 includes a first gate member 230, a second gate member 232, and an endless elastic band 234 received between the first and second gate members 230, 232. The endless elastic band 234 may be described as being sandwiched between the first and second gate members 230, 232. As seen in FIG. 9, the second gate member 232 includes a track 236, for receiving a portion of the endless elastic band, as a portion of its interior surface 252. While not visible in FIGS. 7-9, the first gate member 230 also includes a track 236. In one embodiment, the elastic material is a natural or synthetic rubber.

The first and second gate members 230, 232 may be the same or substantially similar members, but are not intrinsically limited in that manner. As illustrated in FIGS. 7 and 9, the first and second gate members 230, 232 are the same, and thus can be positioned facing either the inlet end 122a or the outlet end 122b of the conduit 122. This produces a valve with similar performance regardless of the direction of fluid flow in the conduit 122.

Referring to FIGS. 7 and 9 specifically, the first and second gate members 230, 232 both have openings 233 therein which collectively define a passage 229. In an open position, such as illustrated in FIG. 5, the passage 229 through the sprung gate assembly 228 is aligned with the conduit 122 to allow fluid to flow therethrough. The portion of the gate having passage 229 is referred to herein as the open position portion 240 (FIG. 7), and the adjacent portion, illustrated opposite the slider 266, is referred to as the closed position portion 242 because this portion of the gate 228, when moved to a closed position obstructs the conduit 122 to prevent fluid flow therethrough. The closed position portion 242 of each gate member 230, 232, in this embodiment, has a substantially smooth continuous exterior surface 250. Those of skill will appreciate that the open position and closed position portions 240, 242 may be reversed, with the open position portion 240 opposite the slider 266, providing a second means of changing a gate valve design from normally closed to normally open (or vice versa).

In this first embodiment, the endless elastic band 234 is generally oval shaped and thereby includes an inner perimeter 282 defining an open space, an outer perimeter 284, and opposing first and second sides 286, 288. The endless elastic band 234 is received in the tracks 236 of the first and second gate members 230, 232 with the first side 286 received in one track 236 and the second side 288 received in the other track 236. When the endless band 234 is seated in the tracks 236 of the first and second gate members 230, 232 the first and the second gate members 230, 232 are spaced apart from one another by a distance D (FIG. 7). The tracks 236 are positioned to recess or inset the endless elastic band 234 a distance from the outer perimeter of the gate members as well. As seen in FIG. 8, this construction defines a channel 254 around the outer surface of the endless elastic band 234 between the first and second gate members 230, 232 for fluid flow around the sprung gate 228 within the pocket 126. When the vent port 170 is present, the channel 254 is in fluid communication therewith. This venting via channel 254 is generally perpendicular to the direction of fluid flow through the conduit 122 and vents fluid from the pocket 126 as the armature 106 moves the gate more fully into the pocket.

The endless elastic band 234 is compressible between the first and the second gate members 230, 232 and therefore functions as a spring acting parallel to the direction of flow through the conduit 122. Additionally, the endless elastic band 234 is expandable radially outward in response to forces applied to the endless elastic band 234 by fluid flowing through the conduit 122 to form a seal between the endless elastic band 234 and the outer wall portion of the tracks 236 in the first and second gate members 230, 232. The endless elastic band 234 biases the first and second gate members into a sealing engagement with opposing walls of the pocket 126.

In operation, in the open position as illustrated in FIGS. 2 and 5 with reference to the sprung gate assembly of FIGS. 7-9, the fluid flowing through the conduit, whether flowing left to right or right to left, passes through passage 229 in the sprung gate assembly 228 and the pressure of the fluid provides a force acting on the endless elastic band 234 directed radially outward thereby pressing the endless elastic band into sealing engagement with the outer perimeter of the tracks 236. This sealing engagement reduces or prevents fluid leakage into the actuator 103, which renders the sprung gate assembly 228 more leak resistant than a single-material, uniformly rigid gate. This embodiment is well suited for use with naturally aspirated engines, in particular with air flowing at atmospheric or sub-atmospheric pressures through the conduit 122. However, in an embodiment where the conduit 122 is connected to the boost pressure side of a supercharged air intake system, the leak protection provided by the endless elastic band 234 aids in preventing the fluid flowing through the conduit 122 from generating pressures within the pocket 126 which could act to push the sprung gate assembly 228 (and armature 106, etc.) to another position or otherwise impede controlled movement of the assembly. The pressures in a supercharged engine, and experienced by the sprung gate assembly 228 and gate valve 100 range between about 5 psi and about 30 psi.

The endless elastic band 234 also produces a gate that is less sensitive to manufacturing tolerances, in particular with respect to the dimensions of pocket 126 and the thickness of the gate members 230, 232, because of the presence of the endless elastic band. The pocket 126 is typically formed to have a width that is smaller than the unloaded width of the sprung gate 228 so as to produce an interference fit. In the sprung gate assembly 228, the endless elastic band 234 becomes compressed between the first and second gate members 230, 232 as the sprung gate 228 is inserted into the pocket 126. The endless elastic band's spring force or biasing action on the first and second gate members 230, 232 when inserted (wedged) into the pocket 126 presses each respective gate member into a sealing engagement with a wall of the pocket to reduce or prevent leaks. Most importantly, the substantially lower modulus of elasticity of the endless elastic band versus that of the rigid gate members 230, 232, or that of a single rigid gate, means that the normal forces acting upon the sprung gate assembly 228 and resisting linear movement of the assembly along its path are substantially less. This reduces the frictional forces (frictional force is equal to normal force times the coefficient of friction) and thus the required solenoid operating force. This benefit is equally applicable to the other embodiments described below.

Figure 10:
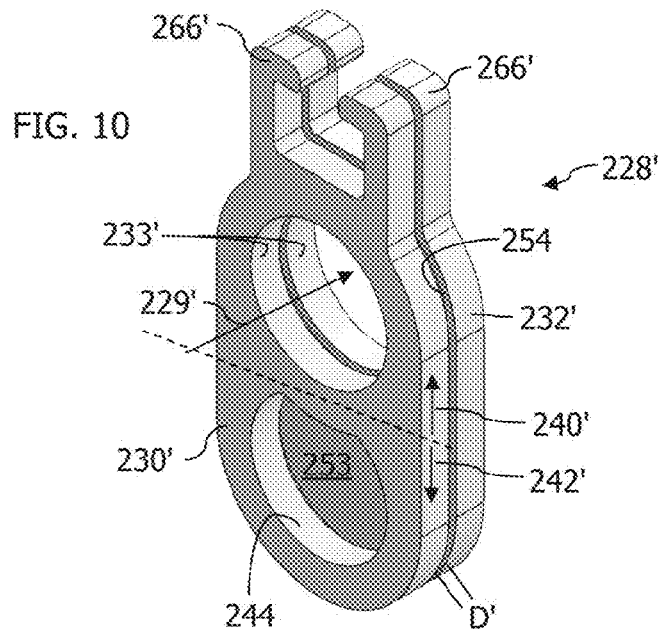
FIGS. 10-11 are a side perspective view and a side perspective exploded view, respectively, of another embodiment of a sprung gate assembly.
Figure 11:
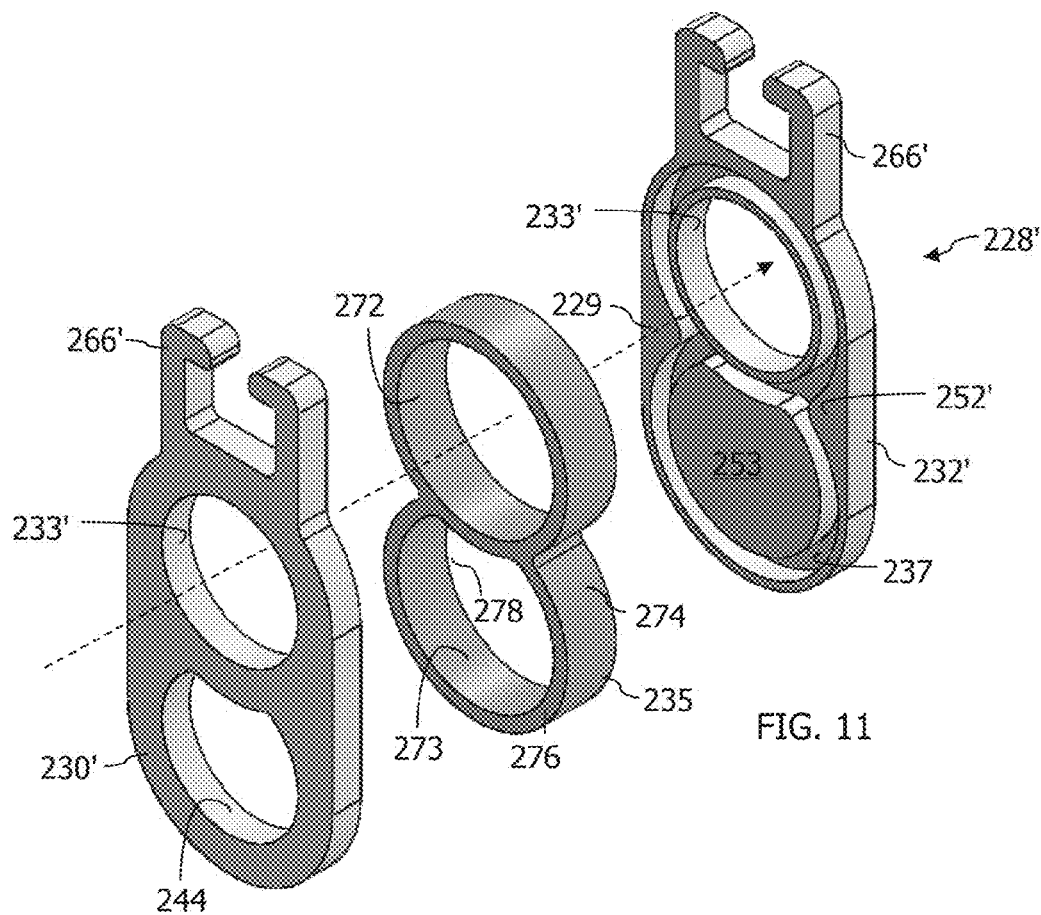

Referring now to FIGS. 10 and 11, a second embodiment of a sprung gate assembly, generally designated as reference number 228', is provided, which similarly includes a first gate member 230', a second gate member 232', and an endless elastic band 235 received between the first and second gate members 230', 232'. The endless elastic band 235 may be described as being sandwiched between the first and second gate members 230', 232'. As seen in FIG. 11, the second gate member 232' includes a track 237 as a portion of or recessed into its interior surface 252' for receiving a portion of the endless elastic band 235. While not visible in FIGS. 10 and 11, the first gate member 230' also includes a track 237. Both gate members 230', 232' also include a slider 266' for slideably coupling the gate assembly 228' to the armature 106 as described above. However, as discussed above, in all such embodiments the members 230, 230', 232, 232', etc. may alternately include a guide rail and racetrack grooves similar to the guide rail 162 and racetrack grooves 164 of the stem 114 or collectively define a multi-part socket 468 for receiving an annular plate head 167.

Here, as illustrated in FIG. 11, the endless elastic band 235 is generally a figure-eight shaped band of elastic material and thereby includes a first inner perimeter 272 defining a first open space, a second inner perimeter 273 defining a second open space, an outer perimeter 274, and opposing first and second sides 276, 278. The endless elastic band 235 is received in the tracks 237 of the first and second gate members 230', 232' with the first side 276 received in one track 237 and the second side 278 received in the other track 237. Since the endless elastic band 235 is figure-eight shaped, the track 237 is also typically figure-eight shaped. When the endless elastic band 235 is seated in the tracks 237' of the first and second gate members 230', 232', the first and the second gate members 230', 232' are spaced apart from one another by a distance D' (FIG. 10). The tracks 237 are positioned to recess the endless elastic band 235 a distance from the outer perimeter of the first and second gate members 230', 232'.

In the embodiment shown in FIGS. 10 and 11, the first and second gate members 230', 232' are structurally different from one another, but both have first openings 233' therein which collectively defines a passage 229' which, in an open position, is aligned with the conduit 122 to allow fluid to flow therethrough. This portion of the gate is referred to as the open position portion 240' (FIG. 10), and an adjacent portion thereto, opposite the slider 266', is referred to as the closed position portion 242' because this portion of the spring gate assembly 228', when moved to a closed position, obstructs the conduit 122 to prevent fluid flow therethrough. In this embodiment, the closed position portion 242' of the first gate member 230' includes a second opening 244 therethrough. The second opening may be dimensioned substantially the same as the first opening 233'. The second gate member 232' does not include a second opening in the closed position portion 242' thereof. Instead, the closed portion 242' of the second gate member 232' has a substantially continuous smooth exterior surface. The second gate member 232' may optionally include a plug 253 projecting from its interior surface 252'. This plug 253 fits within the dimensions of the second open space defined by the endless elastic band 235, and is dimensioned to be at least the size of the second opening 244 in the first gate member 230', which defines a smaller opening than the second inner perimeter 273 of the endless elastic band 235. The plug 253 may be a substantially smooth portion of the interior surface 252' of the second gate member 232'.

In the open position, fluid flowing through passage 229' provides a force acting on the endless elastic band 235 directed radially outward thereby pressing the endless elastic band into sealing engagement with the outer perimeter of the tracks 237. This sealing engagement reduces or prevents fluid leakage into the actuator 103 and pocket 126, which renders the gate 228' in the embodiment of FIGS. 10 and 11 more leak resistant than a single-material, uniformly rigid gate.

In the closed position, fluid flow in the conduit 122 may be in the direction toward the side of the sprung gate 228' defined by the first gate member 230', i.e., the first gate member 230' may face an inlet end 122a of the gate valve 100. In particular, this orientation of flow is beneficial when the conduit 122 is connected to the boost pressure side of a supercharged air intake system and generally is operated to stop boost pressure from flowing therethrough. This is so because the boost pressure passes through the second opening 244 and is directed by the plug 253 toward the second inner perimeter 273 of the endless elastic band 235 to act radially outwardly on the endless elastic band to sealingly engage it against the tracks 237 of the first and second gate members 230', 232'. The presence of the second opening 244 also minimizes the surface area of the exterior surface of the first gate member 230' upon which the boost pressure can apply a force acting parallel to the flow direction within the conduit 122 to axially compress the endless elastic band 235. If the boost pressure does compress the endless elastic band 235 in the axial direction, one of the gate members 230', 232' would move closer to the other, decreasing D', and creating a gap between one wall of the pocket 126 and that gate member through which fluid could leak. This is an undesirable result. Accordingly, for gate member 228', it would be undesirable for the boost pressure to flow into the conduit in a direction that would impact the second gate member's 232' substantially continuous smooth exterior surface. In the example illustrated in FIG. 6, the opposite orientation of flow is beneficial since the highest pressure differential is likely to be a reversed pressure differential caused by boost pressure within the intake manifold crossing the aspirator to an outlet side of the gate valve.

Figure 12:
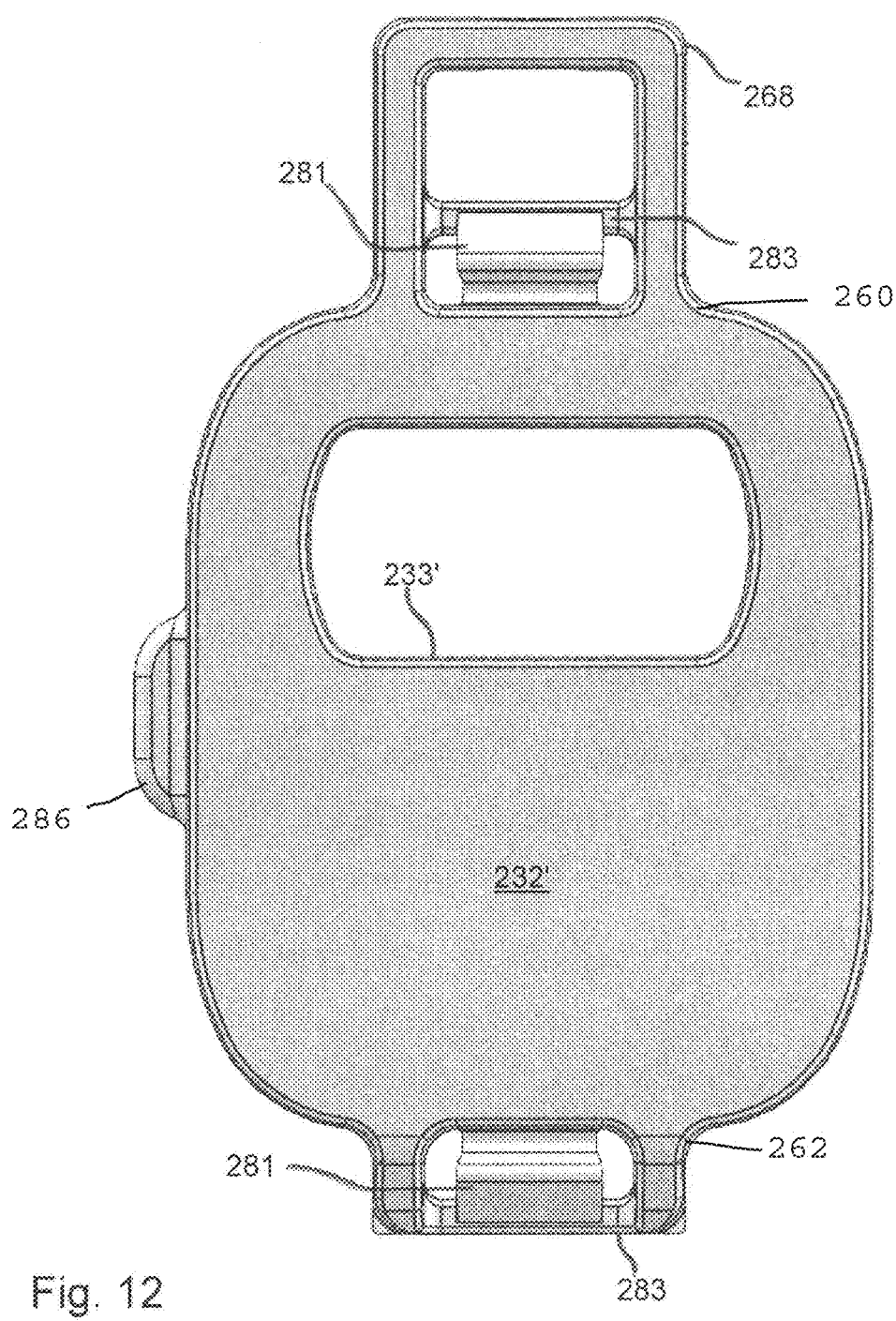
FIGS. 12-14 are a front view of a variant sprung gate member, a side cross-section of a variant sprung gate assembly, and a top perspective view of the variant sprung gate assembly. A pair of latches 281 are shown in FIG. 12 for context.
Figure 13:
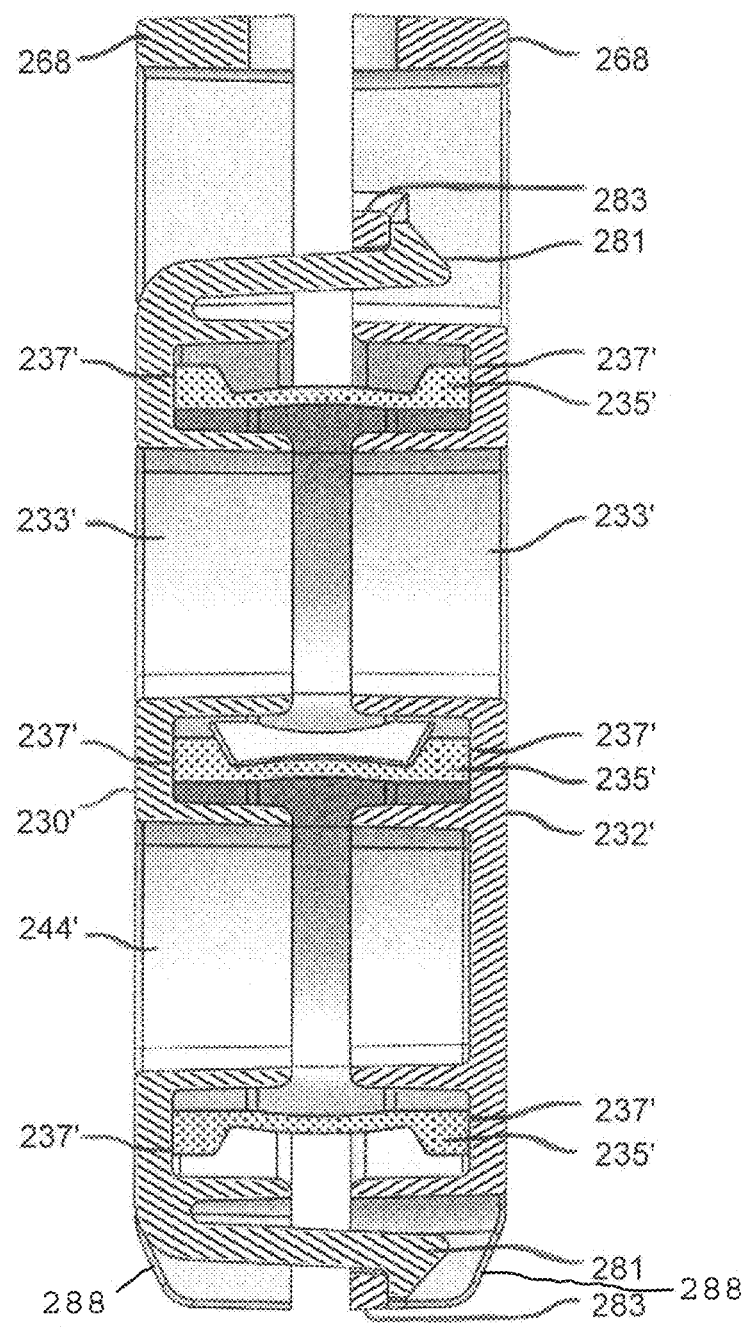
Figure 14:
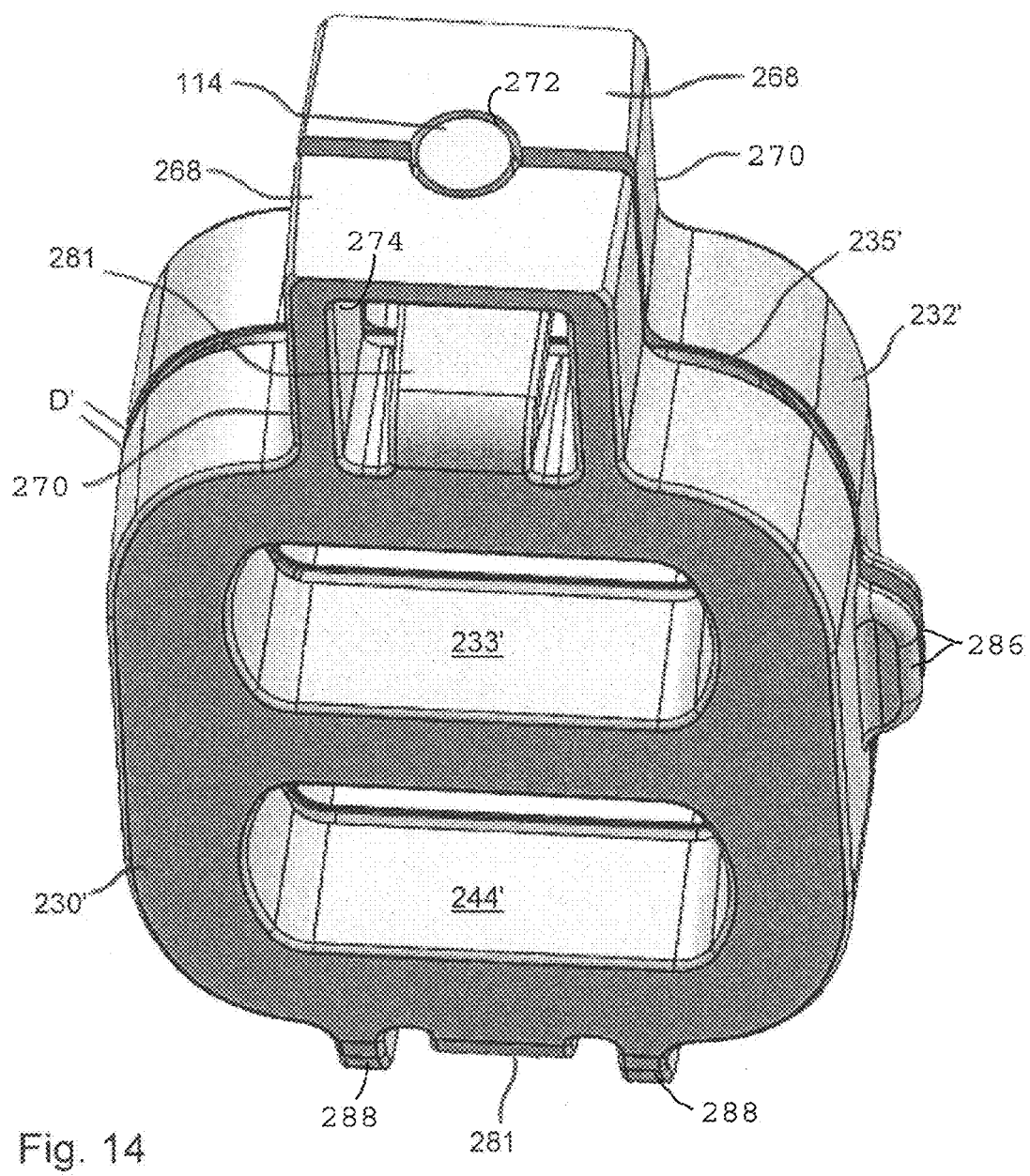

Referring now to FIGS. 12-14 and also FIG. 20, in a variant of this or other embodiments, one of the gate members 230', 232' of FIGS. 12-14 and the gate members 430, 432 of FIG. 20 may include a latch 281, 481 (respectively) and the other of the gate members 230', 232' may include a correspondingly disposed detent 283, 483 (respectively). As illustrated, the one may include a plurality of latches 281, 481 and the other may include a plurality of detents, or each may include one latch 281, 481 and one detent 283, 483, with the latch 281, 481 and detent 283, 483 disposed on opposite ends of the gate member 230', 232' or 430, 432 to correspond to the disposition of its counterpart element. The latches 281, 481 and detents assist in the assembly of the sprung gate assembly 228' (or 128, 228, 428 etc.) by actively retaining the assembly in an assembled configuration prior to insertion within the pocket 126.

Figure 15:
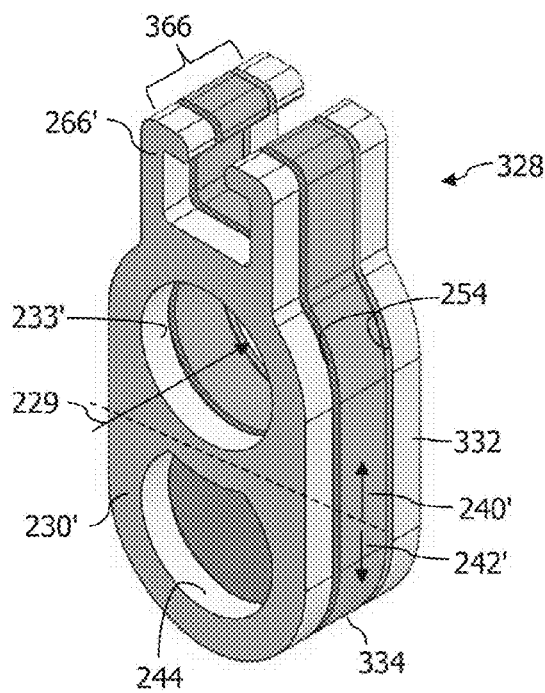
FIGS. 15-17 are a side perspective view, a front view, and a longitudinal cross-section of yet another embodiment of a sprung gate assembly.
Figure 16:
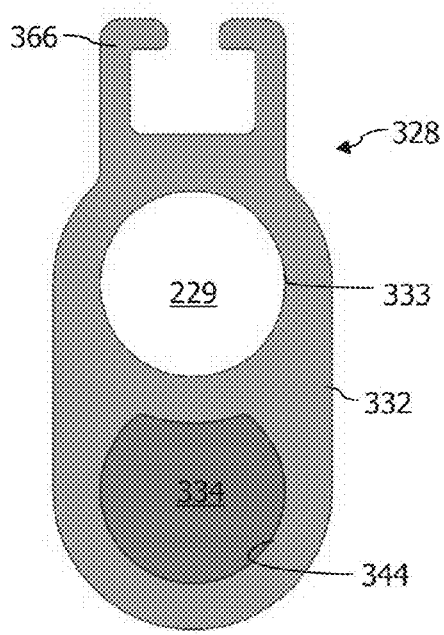
Figure 17:
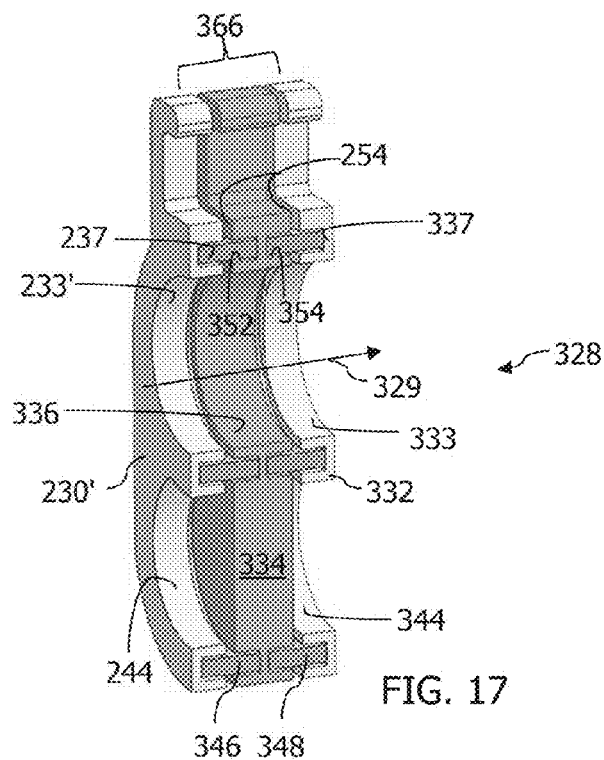

Referring now to FIGS. 15-17, a universal sprung gate assembly (operable with flow directed toward either of the first or the second gate members) is illustrated and designated by reference numeral 328. The universal sprung gate 328 has the same first gate member 230' as the embodiment in FIGS. 10 and 11, a second gate member 332 that has the same general construction as the first gate member 230', an inner gate member 334 that provides the obstruction necessary for the closed position, a first endless elastic band 346 disposed within a track defined between the first gate member 230' and the inner gate member 334, and a second endless elastic band 348 disposed within a track defined between the second gate member 332 and the inner gate member 334. The second gate member 332, see FIG. 16, may include a slider 366, a first opening 333 in the open position portion 240', and a second opening 344 in the closed position portion 242' thereof. The inner gate member 334 includes an opening 336 in an open position portion 240' thereof and has opposing substantially continuous exterior surfaces defining the closed position portion 242', which can obstruct the flow of fluid through the conduit when the universal sprung gate 328 is in the closed position.

In the embodiment of FIGS. 15-17, the figure-eight shaped endless elastic band is preferred because of the two openings in each of the first and second gate members 230', 332. The figure-eight shaped endless elastic bands 346, 348 are as described above. Here, the first endless elastic band 346 is seated both in a first track 352 in the inner gate member 334 and in a track 237 in the first gate member 230', which are preferably in the shape of a figure-eight dimensioned to receive the first endless elastic band 346. Similarly, the second endless elastic band 348 is seated both in a second track 354 in the inner gate member 334 and in a track 337 in the second gate member 332, which are preferably in the shape of a figure-eight dimensioned to receive the second endless elastic band 348.

In operation, the universal sprung gate 328, in the open position and in the closed position, operates as described above with respect to the first gate member side of the sprung gate 228' of FIGS. 10 and 11. The universal sprung gate 328 may be used in normally aspirated, supercharged, or turbocharged engines without requiring any particular flow orientation. Its universal nature and the benefit of the reduced surface area in the closed position portion of each of the first and second gate members makes this gate function to seal the gate to reduce or prevent leakage into the actuator 103 and pocket 126 regardless of the direction of flow through the conduit. This embodiment also has the benefit of providing multiple channels 254 around the exterior of the endless elastic band to provide fluid communication between the actuator and the vent port 170, if present.

Also, in a variant of this or other embodiments, as shown in FIGS. 12-14 and in the embodiment of FIG. 20, the gate members 230', 232' of FIGS. 12-14 and 430, 432 of FIG. 20 each include a connecting member 270 protruding from the trailing end 260 thereof toward the stem 114 of the actuator 103. The trailing end 260 is relative to a leading end 262 during insertion of the gate assembly into the pocket 126. The connecting members 270 collectively define a multipart socket 268 having a generally annular opening 272 for receiving a portion of the stem 114 and a larger chamber 274 for receiving the plate-like head 167, which may also be annularly shaped. The multi-part socket 268 snaps around the head 167 of the stem 114 of the mechanical coupling as shown in FIG. 22. The multi-part socket 268 assists in the assembly of the sprung gate assembly 228' (or 128, 228, etc.) by actively retaining the assembly upon the stem 114 prior to insertion within the pocket 126. The larger chamber 274 is typically larger than the plate-like head 167 of the stem 114 thereby providing clearance for the sprung gate assembly to rotate about the stem 114. As mentioned above, this is advantageous because the spring gate assembly 228', 428 will be free to rotate 360 degrees or more relative to the stem 114 during assembly.

With reference to FIGS. 12 and 14, one or more of the gate members 230', 232' may include an orientation member 286, which is applicable to all embodiments of the sprung gate assembly disclosed herein. In one embodiment, the orientation member 286 may be a tab protruding outward from the side of one or more of the gate members 230', 232'. Accordingly, the pocket 126 will have a receiving orientation member (not shown) shaped and sized to receive the orientation member 286. The orientation member 286 and receiving orientation member may be any type of key and keyway configuration and either the pocket or the gate assembly may have either portion thereof.

Additionally, any of the sprung gate assemblies, for ease of insertion into the pocket 126, may include tapered legs 288 as shown in FIGS. 13, 14, and 20 extending away from the leading end 262 of either or both of the gate members 230', 232', 430, 432, wherein the taper of legs 288 is in the exterior surface of the gate member and the taper is inward in a direction generally toward a plane coincident with the interior surface of the same gate member.

Figure 18:
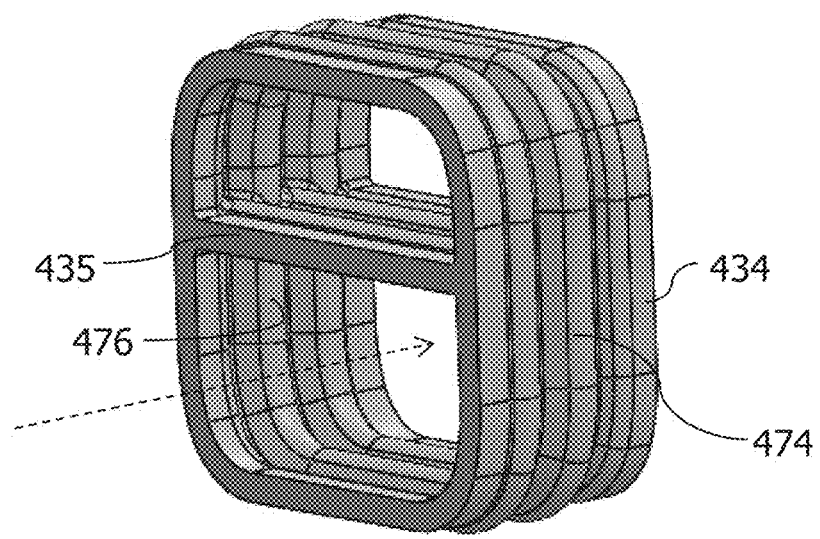
FIG. 18 is an embodiment for a bellowed, endless elastic band.
Figure 19:
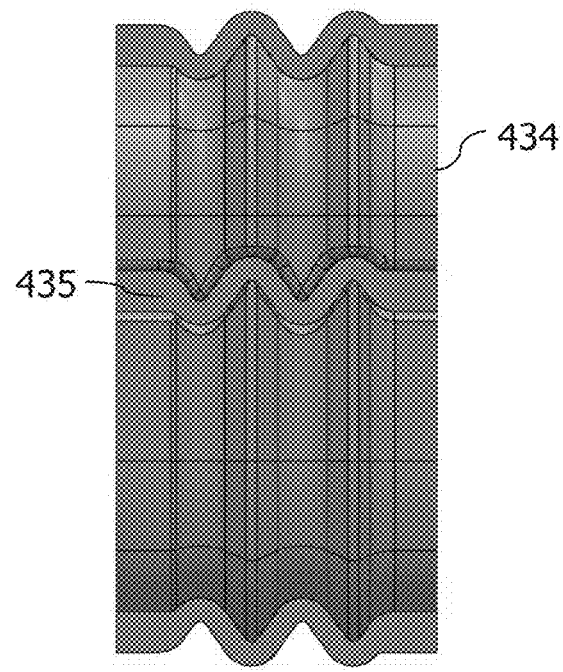
FIG. 19 is a longitudinal cross-sectional view of the bellowed, endless elastic band of FIG. 18.

Referring now to FIG. 20, a fifth embodiment of a sprung gate assembly, generally designated as reference number 428, is provided, which similarly includes a first gate member 430, a second gate member 432, and an endless elastic band 434, as described with respect to FIGS. 18 and 19 herein, received between the first and second gate members 430, 432. The endless elastic band 434 may be described as being sandwiched between the first and second gate members 430, 432. In this embodiment, the general construction of the first and second gate members 430, 432 corresponds to the construction described with respect to FIGS. 10 and 11. The second gate member 432 includes a track 437 as a portion of or recessed into its interior surface 452 and so does the first gate member 430 such that the tracks 437 each receive a portion of the endless elastic band 434 once assembled together, and the first and second gate members 430, 432 are structurally different from one another, but both have first openings 433 therein collectively defining a passage 429. In this embodiment, the closed position is defined by a second opening 444 in the first gate member aligned with a plug 453 projecting from the interior surface 452 of the second gate member 432. This plug 453 fits within the dimensions of the second open space defined by the endless elastic band 434, and is dimensioned to be at least the size of the second opening 444 in the first gate member 430, which defines a smaller opening than a corresponding inner perimeter of the endless elastic band 434. The plug 453 may be a substantially smooth portion of the interior surface 452 of the second gate member 432.

In each embodiment of the sprung gates disclosed herein, the endless elastic band was illustrated as a generally smooth band having a generally rectangular cross-section as seen in FIGS. 9 and 11. The endless elastic band, however, is not limited to such a construction. In another embodiment, the endless elastic band may have a generally irregular inner and outer surface as seen in FIGS. 18 and 19. In this embodiment, the endless elastic band, is generally referred to as a bellowed, endless elastic band 434, which has an undulating outer perimeter 474 and an inner perimeter 476 oppositely undulating relative thereto. When the endless elastic band 434 has the generally figure 8-shaped configuration, the cross member 435, forming the center of the eight, may also be bellowed. The bellows in the cross member 435 and the main part of the band, as shown in FIGS. 18 and 19, are oriented transverse to the direction of fluid flow through the conduit and, hence, through the endless elastic band itself. The bellowed, elastic band 434 is advantageous because it provides more even compression of the band between the first and second gate members.

As noted above, one of the benefits of many aspects of the embodiments disclosed herein is that a smaller solenoid actuator can be used to linearly translate the gate between its open and closed positions. In particular, the sprung gate embodiments disclosed herein require less than a three pound force to linearly translate the gate from a first position to a second position (open to closed or closed to open) and require little to no holding force from the solenoid actuator, i.e., just enough force to overcome the return spring force. In one embodiment, the solenoid actuator, which includes the housing it is enclosed in, but not the sprung gate assembly or the conduit, is of a size that it only weighs about 350 grams or less. In another embodiment, the solenoid actuator is of a size that it weighs about 290 grams.

Another aspect of the valve devices that allows for these smaller solenoid actuators is shown in FIG. 21. The opening 433 (as labeled in FIG. 20) in each of the first and second gate members of any embodiment herein that define the passage 229, 429 through the sprung gate is generally rectangular with a longitudinal axis C thereof oriented generally perpendicular to a longitudinal axis A of the conduit. The conduit 122 has a generally circular or oval inner dimension proximate the pocket 126, wherein the area of the opening 433 in each of the first and second gate members has approximately the same area as the generally circular or oval inner dimension of the conduit. The rectangular shape of the opening 433 provides a gate that need not travel as far to reach a fully open position or a fully closed position, which requires less power since the distance of travel is reduced. Accordingly, a smaller solenoid may be used. An opening of approximately the same area as the inner dimension of the conduit is one that has the same area or an area that is +/−5% of the area of the inner dimension of the conduit. Having approximately the same area means that the opening defining the passage through the sprung gate has approximately the same flow area of the conduit.

Referring now to FIG. 22, a valve device 500 is illustrated that is similar to the device of FIGS. 1-3 and as such like reference numbers represent the same or similar components. The valve device 500 includes a housing 502 containing an actuator 103 having a solenoid coil 104 and an armature 106 connectable to a valve mechanism 120 and electrically coupled to an electrical connector 109. A biasing element, a coil spring 112 in the figure, biases the armature 106 into either the open position or the closed position. The valve mechanism 120 includes a conduit 122 defining a connection opening 124 facing the armature 106 and opening into a pocket 126 for receiving a sprung gate assembly 128 that is linearly movable within the pocket 126. The pocket 126 separates the conduit 122 into a first section 122a and a second section 122b and the ends of conduit adjacent to the pocket 126 define valve opening 123. The conduit 122 may be a tube that continuously, gradually tapers or narrows along a longitudinal axis "A" from both ends toward the valve opening 123, thereby having its smallest inner diameter at the valve opening 123 as described above.

The housing 502 include a flange 504 for connecting the housing to the valve mechanism 120, in particular to the conduit 122. An airtight seal is desirable between these two components and is accomplished herein by spin welding the flange 504 of the housing 502 to a mating flange 506 of the conduit. The conduit includes the mating flange 504, which is a generally annular flange disposed about the connection opening 124 of the pocket 126. The flange 504 of the housing 502 may have either a generally V- or W-shaped cross-sectional profile and the mating flange 506 of the conduit 122 has the opposite profile relative thereto. For example, as shown in FIG. 22, the flange 504 of the housing 502 is a generally W-shaped cross-sectional profile and the mating flange 506 of the conduit 122 is a generally V-shaped cross-sectional profile. As such, the arms of the V-shaped profile are seated in the gaps defined by the W-shaped profile.

Once the flange 504 and mating flange 506 are mated with one another, either the housing or the conduit may be held stationary and the other component may be rotated relative thereto, with the application of pressure, 360 degrees or more to weld the components together. Here, at least the flange 504 and mating flange 506 comprise a plastic material, typically a thermoplastic material, that melt and become welded together as a result of the pressure and friction created by rotating one component relative to the other.

In embodiment, the assembly of the valve device includes a spin welding step. The method includes providing an actuator enclosed within a housing, such as housing 502, having a stem protruding from the housing and having a flange, an unassembled sprung gate, and a conduit, such as conduit 122, having a mating flange. Then, the method includes fastening the first gate member and the second gate member to one another with an endless elastic band sandwiched therebetween and with the connecting member of each gate member of the sprung gate disposed about the stem to define an assembled sprung gate. Next, the assembled sprung gate is mated with the pocket of the conduit and the flange of the housing and the mating flange of the conduit are spin welded together. The flange and mating flange may be as described above with respect to FIG. 22.

The spin welding may include providing a stationary jig shaped and configured to hold either the housing or the conduit stationary and an opposing jig or chuck that is rotatable relative to the stationary jig. The chuck is shaped and configured to hold either the housing or the conduit. In one embodiment, the stationary jig is shaped and configured to hold the housing stationary and the chuck is shaped and configured to rotate the conduit and the sprung gate together relative to the housing. The spin welding may include rotating the conduit and the assembled sprung gate at least 360 degrees relative to the housing.

It should be noted that the embodiments are not limited in their application or use to the details of construction and arrangement of parts and steps illustrated in the drawings and description. Features of the illustrative embodiments, constructions, and variants may be implemented or incorporated in other embodiments, constructions, variants, and modifications, and may be practiced or carried out in various ways. Furthermore, unless otherwise indicated, the terms and expressions employed herein have been chosen for the purpose of describing the illustrative embodiments of the present invention for the convenience of the reader, and are not for the purpose of limiting the invention.

Having described the invention in detail and by reference to preferred embodiments thereof, it will be apparent that modifications and variations are possible without departing from the scope of the invention which is defined in the appended claims.

What is claimed is:

1. A valve device comprising:
 a valve mechanism comprising a conduit separated into a first section and a second section by a pocket having a sprung gate seated therein, wherein inner dimensions of both of the first section and the second section gradually narrow toward the pocket;
 an actuator connected to the sprung gate;
 wherein the actuator moves the sprung gate linearly within the pocket between an open position and a closed position relative to the conduit;
 wherein the sprung gate comprises:
  a first gate member and a second gate member each defining an opening therethrough in an open position portion thereof and defining a closed position portion; and
  an endless elastic band disposed between the first and second gate members at a position that recesses the endless elastic band a distance from the outer perimeter of the open position portion and the closed position portion and spaces the first and second gate members apart a distance to define a channel that extends around the outer surface of the sprung gate along the outer surface of the endless elastic band for fluid flow around the sprung gate; wherein the endless elastic band has an inner perimeter defining at least a first open space and is sandwiched in compression between the first and second gate members with the first open space oriented for alignment with the opening in both of the first and second gate members, which are aligned to form a passage through the sprung gate;
 wherein the endless elastic band applies a bias force to the first and second gate members biasing them away from one another toward opposing walls of the pocket; and
 wherein the first gate member includes a fastener connected to a fastener receiving member of the second gate member thereby securing the first and second gate members together.

2. The valve device of claim 1, wherein the fastener is a latch and the fastener receiving member is a detent in the second gate member.

3. The valve device of claim 1, wherein the first gate member includes a first fastener at a trailing end thereof and a second fastener at a leading end thereof, and the second gate member includes a first fastener receiving member positioned for alignment with the first fastener and a second fastener receiving member positioned for alignment with the second fastener.

4. The valve device of claim 1, wherein the first and second gate members each include a connecting member protruding from a trailing end thereof that together collectively define a multi-part socket, wherein the multi-part socket allows the sprung gate to rotate 360 degrees or more about its central longitudinal axis.

5. The valve device of claim 1, wherein the endless elastic band is a bellowed elastic band having the bellows oriented transverse to the direction of flow.

6. The valve device of claim 1, wherein the first endless elastic band is generally oval-shaped or is generally figure 8-shaped.

7. The valve device of claim 1, wherein the first gate member defines a second opening therethrough in the closed position portion thereof, and the second gate member, in the closed position portion thereof, includes a plug projecting from its inner surface toward the second opening in the first gate member.

8. The valve device of claim 1, wherein the opening in each of the first and second gate members that define the passage is generally rectangular with a longitudinal axis thereof oriented generally perpendicular to a longitudinal axis of the conduit.

9. The valve device of claim 8, wherein the conduit has a generally circular or oval inner dimension proximate the pocket, wherein the area of the opening in each of the first and second gate members has approximately the same area as the generally circular or oval inner dimension of the conduit.

10. The valve device of claim 1, wherein the actuator is a solenoid actuator applying a three pound force or less to linearly translate the sprung gate.

11. A method for assembling an actuator-sprung gate assembly, the method comprising:
 providing an actuator enclosed within a housing and having a stem protruding from the housing, wherein the housing includes a flange;
 providing a sprung gate comprising:
 an endless elastic band having an inner perimeter defining at least a first open space; and
 a first gate member and a second gate member each defining an opening therethrough in an open position portion thereof and defining a closed position portion;
 wherein the endless elastic band is disposed between the first and second gate members at a position that recesses the endless elastic band a distance from the outer perimeter of the open position portion and the closed position portion and spaces the first and second gate members apart a distance to define a channel that extends around the outer surface of the sprung gate along the outer surface of the endless elastic band for fluid flow around the sprung gate;
 wherein the endless elastic band is sandwiched in compression between the first and second gate members with the open space thereof oriented for alignment with the opening in both of the first and second gate members, which are aligned to form a passage through the sprung gate; and
 wherein the endless elastic band applies a bias force to the first and second gate members biasing them away from one another toward opposing walls of the pocket;
 wherein the first gate member includes a fastener connected to a fastener receiving member of the second gate member thereby securing the first and second gate members together, and the first and second gate members together collectively define a multi-part socket that allows the sprung gate to rotate 360 degrees or more about its central longitudinal axis;
 providing a conduit separated into a first section and a second section by a pocket, the conduit having a mating flange and the inner dimensions of both of the first section and the second section gradually narrow toward the pocket;
 fastening the first gate member and the second gate member to one another with the endless elastic band sandwiched therebetween and with the connecting member of each disposed about the stem of the actuator to define an assembled sprung gate;
 mating the assembled sprung gate with the pocket of the conduit; and
 spin welding the flange of the housing to the mating flange of the conduit.

12. The method of claim 11, wherein the flange of the housing has either a generally V- or W-shaped cross-sectional profile, the mating flange of the conduit has either a generally V- or W-shaped cross-sectional profile, and the flange and the mating flange have different cross-sectional profiles.

13. The method of claim 11, wherein the spin welding includes holding the housing stationary and rotating the conduit and the assembled sprung gate together about the stem of the actuator, at least 360 degrees.

14. The method of claim 11, wherein the actuator is a solenoid actuator.

15. A valve device comprising:
 a valve mechanism comprising a conduit separated into a first section and a second section by a pocket having a sprung gate seated therein, wherein inner dimensions of both of the first section and the second section gradually narrow toward the pocket;
 an actuator comprising a biasing member and a solenoid connected to the sprung gate to linearly move the sprung gate within the pocket between an open position and a closed position relative to the conduit, the solenoid having an armature with an internal recess tapering in a direction that provides a gradual increase in pull-in force to overcome the biasing member;
 wherein the sprung gate comprises:
 a first gate member and a second gate member each defining an opening therethrough in an open position portion thereof and defining a closed position portion; and
 an endless elastic band disposed between the first and second gate members at a position that recesses the endless elastic band a distance from the outer perimeter of the open position portion and the closed position portion and spaces the first and second gate members apart a distance to define a channel that extends around the outer surface of the sprung gate along the outer surface of the endless elastic band for fluid flow around the sprung gate;
 wherein the endless elastic band has an inner perimeter defining at least a first open space sandwiched in compression between the first and second gate members with the first open space thereof oriented for alignment with the opening in both of the first and second gate members, which are aligned to form a passage through the sprung gate;
 wherein the endless elastic band applies a bias force to the first and second gate members biasing them away from one another toward opposing walls of the pocket.

* * * * *